United States Patent
Gravelle et al.

(10) Patent No.: US 12,437,285 B1
(45) Date of Patent: *Oct. 7, 2025

(54) VEHICLE TRACKING SYSTEM FOR CONGESTION PRICING USING TRANSPONDERS

(71) Applicant: Amtech Systems, LLC, Albuquerque, NM (US)

(72) Inventors: Kelly Gravelle, Poway, CA (US); Yousuf Kamal, Albuquerque, NM (US); Greg Lantz, Albuquerque, NM (US); Paul Hamel, Albuquerque, NM (US); Dale Scott, Albuquerque, NM (US); Duane Wrasman, Albuquerque, NM (US); Donald Brady, Henderson, NV (US); Scott Brosi, Dallas, TX (US); Alice Klemashevich, Highland Village, TX (US)

(73) Assignee: Amtech Systems, LLC, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,306

(22) Filed: May 1, 2020

Related U.S. Application Data

(60) Provisional application No. 62/841,474, filed on May 1, 2019.

(51) Int. Cl.
*G06Q 20/32* (2012.01)
*G06Q 20/34* (2012.01)
(Continued)

(52) U.S. Cl.
CPC ..... *G06Q 20/3224* (2013.01); *G06Q 20/3226* (2013.01); *G06Q 20/357* (2013.01);
(Continued)

(58) Field of Classification Search
CPC .......................... G06Q 20/3224; G06Q 10/06
See application file for complete search history.

(56) References Cited

U.S. PATENT DOCUMENTS

| | | | | |
|---|---|---|---|---|
| 8,013,760 B2 * | 9/2011 | Turnock | ............... | G07B 15/063 340/928 |
| 8,065,181 B2 * | 11/2011 | McNew | ................ | G06Q 10/06 705/13 |

(Continued)

FOREIGN PATENT DOCUMENTS

JP        2012203735       *    3/2011

*Primary Examiner* — Daniel S Felten
(74) *Attorney, Agent, or Firm* — Banner & Witcoff, Ltd.

(57) ABSTRACT

An RFID transponder including a Bluetooth® compatible transceiver (BLEET) is described. The Bluetooth® compatible transceiver may be configured to set data that is transmitted via one or more RFID transceivers in the transponder and to return data received by the RFID transceiver(s) to a client application running, for example, on a user's smart phone. The BLEET may be used for electronic vehicle tracking or tolling. Vehicle occupancy data may be set by the user with the client application via a Bluetooth® connection in connection with high occupancy vehicle tolling and express lane incentive programs. The BLEET may be used in a congestion pricing (CP) toll area, wherein the smart phone determines a toll rate based on the location, when triggered by the BLEET, that the BLEET was read by an RFID reader located on a boundary of the CP toll area.

20 Claims, 35 Drawing Sheets

(51) Int. Cl.
*G06Q 20/40* (2012.01)
*G06Q 30/0207* (2023.01)
*H04W 4/029* (2018.01)
*H04W 4/80* (2018.01)

(52) U.S. Cl.
CPC ....... *G06Q 20/401* (2013.01); *G06Q 30/0207* (2013.01); *H04W 4/029* (2018.02); *H04W 4/80* (2018.02)

(56) References Cited

U.S. PATENT DOCUMENTS

| | | | | |
|---|---|---|---|---|
| 8,255,284 | B1* | 8/2012 | Ramalingam | H04W 12/08 |
| | | | | 705/26.1 |
| 8,863,256 | B1* | 10/2014 | Addepalli | H04W 12/03 |
| | | | | 713/168 |
| 8,878,936 | B2* | 11/2014 | Nerayoff | G06T 7/20 |
| | | | | 348/148 |
| 8,922,391 | B2* | 12/2014 | Rubin | H04W 74/0816 |
| | | | | 340/436 |
| 9,083,581 | B1* | 7/2015 | Addepalli | B60W 50/10 |
| 9,106,647 | B2* | 8/2015 | Jain | G06Q 20/3574 |
| 9,171,382 | B2* | 10/2015 | Nerayoff | H04N 23/90 |
| 9,794,797 | B2* | 10/2017 | Hoffberg | G06Q 50/188 |
| 10,521,665 | B2* | 12/2019 | Nerayoff | G06V 20/56 |
| 10,769,392 | B1* | 9/2020 | Gravelle | H04W 4/027 |
| 11,049,089 | B2* | 6/2021 | Evans | G06Q 20/3278 |
| 11,055,688 | B2* | 7/2021 | Evans | G06Q 20/3278 |
| 11,341,345 | B1* | 5/2022 | Gravelle | G06K 7/10425 |
| 11,663,427 | B1* | 5/2023 | Gravelle | G06K 19/0716 |
| | | | | 340/10.1 |
| 12,056,566 | B1* | 8/2024 | Gravelle | H04W 4/44 |
| 2004/0212518 | A1* | 10/2004 | Tajima | G07B 15/063 |
| | | | | 340/928 |
| 2010/0201505 | A1* | 8/2010 | Honary | G08G 1/207 |
| | | | | 340/425.5 |
| 2012/0072861 | A1* | 3/2012 | Tuli | G06F 3/0481 |
| | | | | 715/767 |
| 2014/0095272 | A1* | 4/2014 | Zafiroglu | G06Q 20/387 |
| | | | | 705/13 |
| 2015/0317614 | A1* | 11/2015 | Evans | G06Q 20/3278 |
| | | | | 705/13 |
| 2019/0050634 | A1* | 2/2019 | Nerayoff | G07B 15/02 |

* cited by examiner

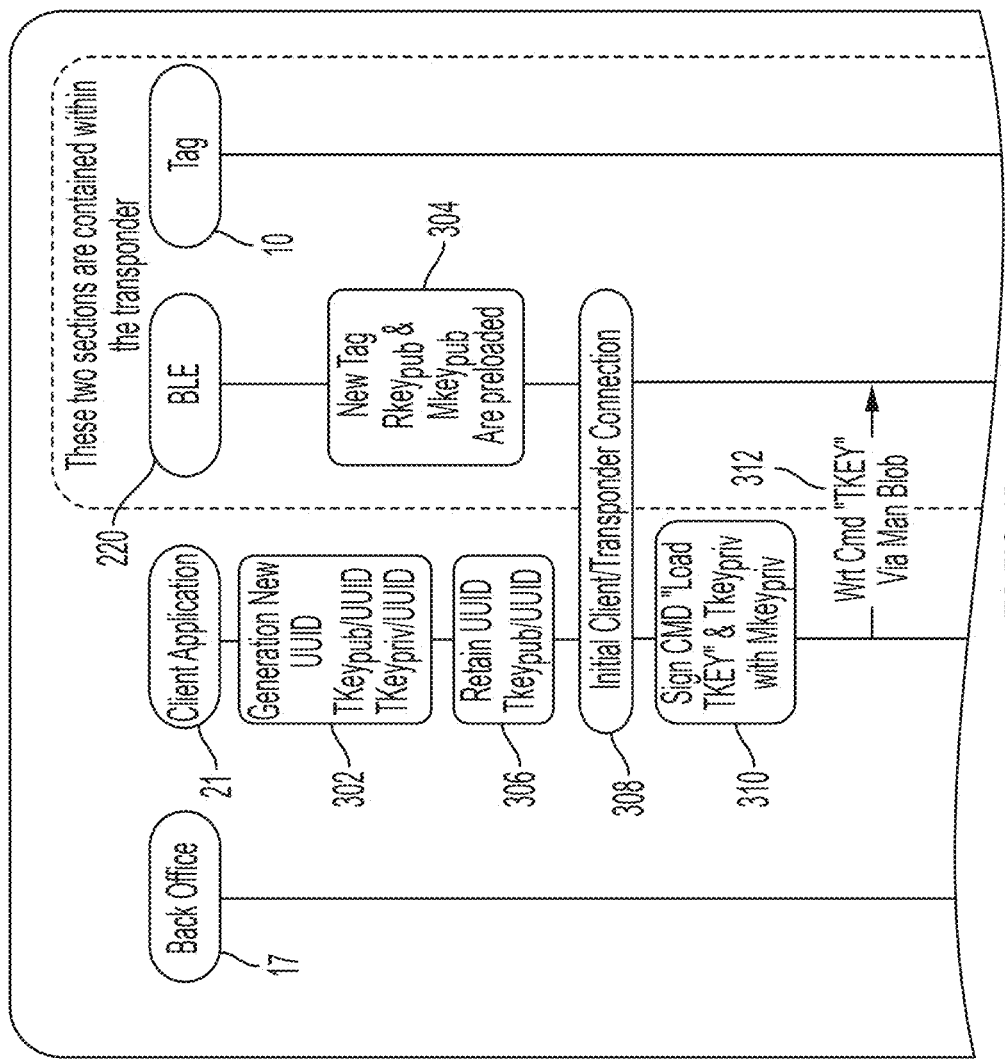

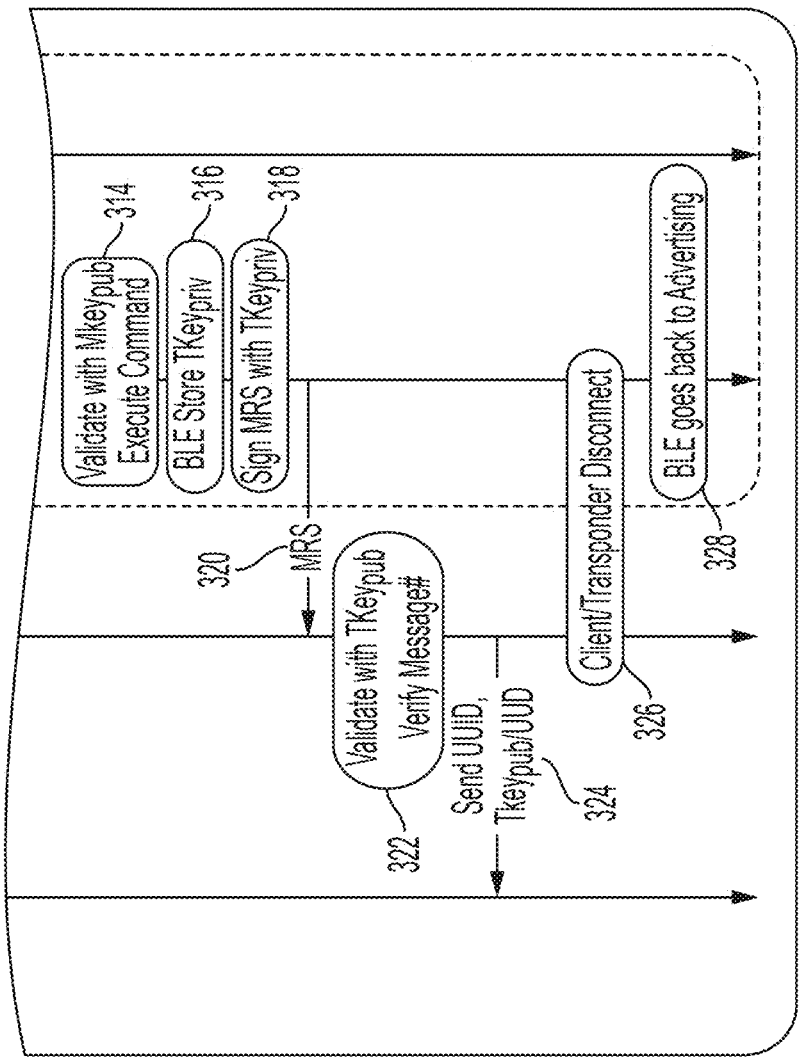

TO FIG. 5B

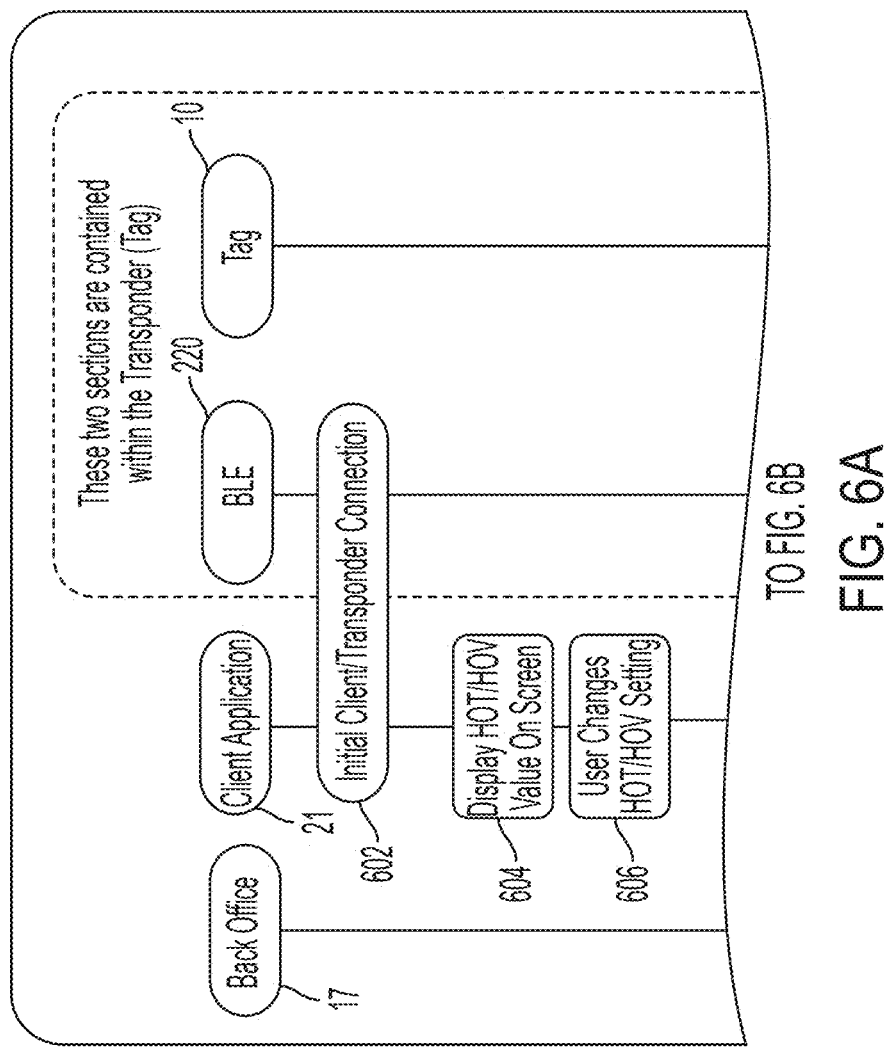

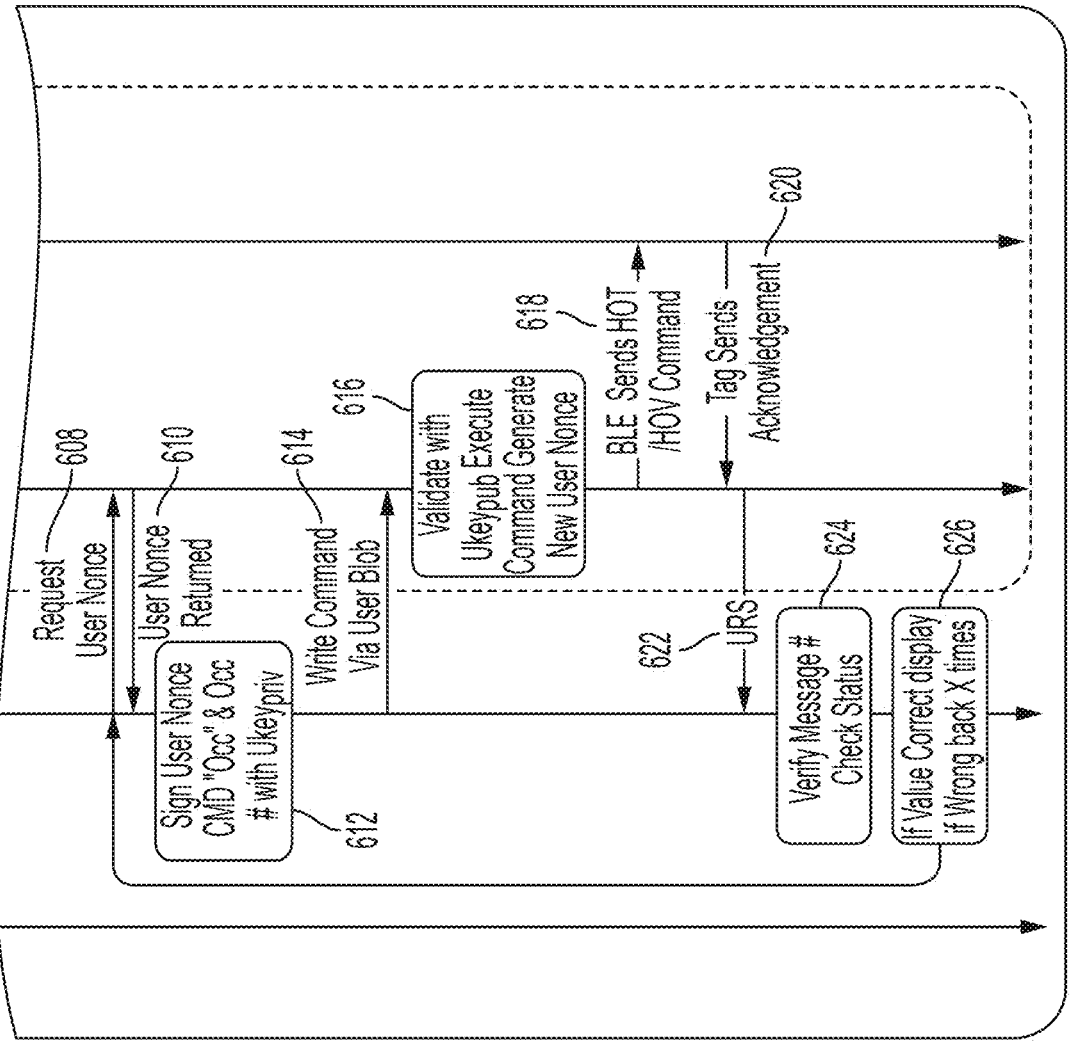

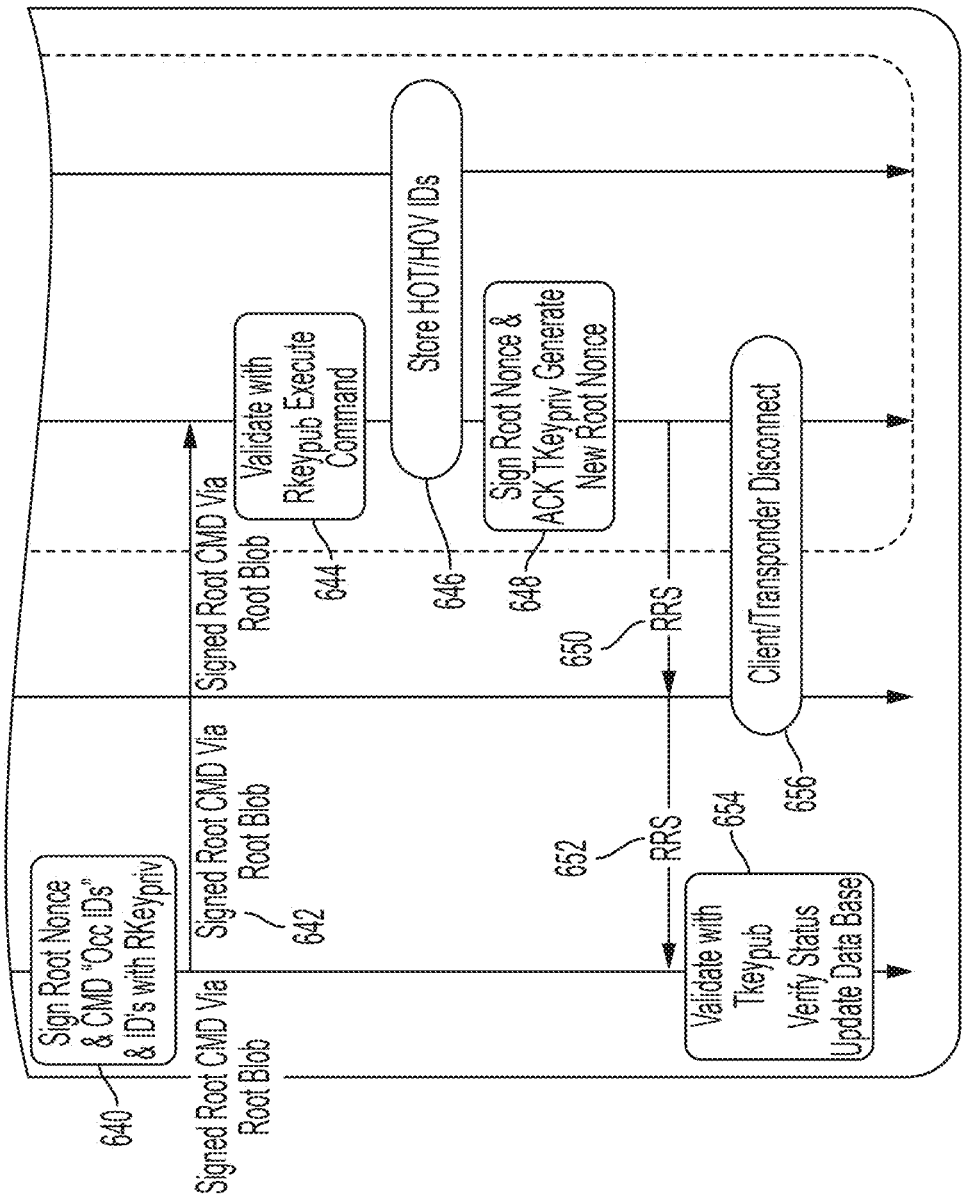

VEHICLE TRACKING SYSTEM FOR CONGESTION PRICING USING TRANSPONDERS

CROSS REFERENCE TO RELATED APPLICATIONS

This application claims priority under 35 U.S.C. § 119 to U.S. Provisional Patent Application No. 62/841,474 filed on May 1, 2019, entitled Vehicle Tracking System for Congestion Pricing Using Transponders, the contents of which are hereby incorporated herein by reference in their entirety. This Application also incorporates by reference, U.S. Non-provisional patent application Ser. No. 16/295,579 titled Vehicle Tracking System Using Transponders, filed on Mar. 7, 2019; U.S. Provisional Patent Application No. 62/640,202 titled Vehicle Tracking System Using Bluetooth Enabled Transponders filed on Mar. 8, 2018; and U.S. Provisional Patent Application No. 62/653,915 titled Vehicle Tracking System Using Bluetooth Enabled Transponders filed on Apr. 6, 2018. The above referenced applications are all hereby incorporated by reference herein in their entireties.

BACKGROUND

The field of electronic vehicle tracking for tolling and other purposes has seen many iterations over the years. These include the use of vehicle-based backscatter transponders that are detected by and communicate with roadside equipment, active transponders that are detected by and communicate with roadside equipment, hybrid transponders having both active and backscatter functions, and video monitoring of vehicle license plate and other placards. Cellular telephones have also been described for use in tolling systems, alone or in combination with the aforementioned types of transponders. These transponders have been implemented in various ways and using combinations of software running on embedded microcontrollers, Application Specific Integrated Circuits (ASICs) (both digital and mixed signal types), discrete logic, digital, and analog circuitry. The transponders may operate in a passive manner whereby a downlink signal (reader to tag) is sent to the tag which includes modulating data on an ultra-high frequency (UHF) carrier signal to the tag including commands to perform certain operations. These tags are powered by harvesting incoming energy from a radio signal such as the UHF carrier signal in the 900 MHz range, which powers the transponder circuitry. The tag typically backscatter modulates the incoming continuous wave (CW) signal to create an uplink (tag to reader) signal in accordance with the said received commands. These types of tags are currently used in the Florida SunPass® system, for example. Tag protocol also may also be used in conjunction with an active transmitter for both downlink and uplink, such as is used in the EZ-Pass® system.

Radio Frequency Identification transponders (RFID tags) used for vehicle tolling are typically programmed at the factory with a unique user identification number that is used to identify the owner of the tag. In the United States, many different tolling protocols are used in the various toll agencies and often tags from one agency are not compatible with tags in another. This incompatibility requires users who would like to utilize toll roads across multiple toll agencies to use multiple toll tags in their vehicles. Multi-protocol tags can work with the various toll agencies and their protocols, however, these tags are programmed at the factory, at time of manufacture and communicate only with dedicated roadside equipment.

BRIEF DESCRIPTION OF THE DRAWINGS

FIGS. 3A and 3B are exemplary signal flow diagrams for initial manufacturing set-up of an exemplary BLEET;

FIGS. 6A and 6B are exemplary signal flow diagrams of a connection between a smart phone and an exemplary BLEET for setting HOV status in the BLEET;

FIGS. 6C and 6D are an exemplary signal flow diagram for a back office push to a mobile phone of HOV data for an exemplary BLEET;

DETAILED DESCRIPTION OF PREFERRED EMBODIMENTS

Those skilled in the art will recognize other detailed designs and methods that can be developed employing the teachings of the present invention. The examples provided here are illustrative and do not limit the scope of the invention, which is defined by the attached claims. The following detailed description refers to the accompanying drawings. The same reference numbers in different drawings may identify the same or similar elements.

Figure 1:
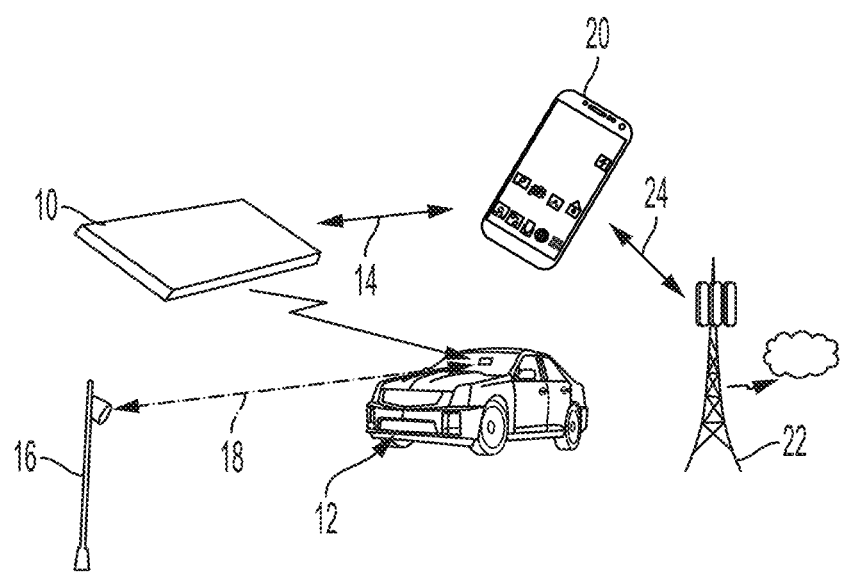
FIG. 1 is an exemplary system diagram comprising a Bluetooth® LE enabled transponder (BLEET)

With reference to FIG. 1, a multi-protocol tag equipped with Bluetooth® short-range wireless technology 10 capability may be paired with a smart phone 20, vehicle 12 or road-side equipment 16 and the tag can be reprogrammed or reconfigured as needed via the Bluetooth® connection to the smart phone. Bluetooth® low-energy (BLE) protocol may be used. A BLEET (Bluetooth® low-energy enabled tag) enables additional functionality as described herein. The smart phone 20 may send and receive information related to the BLEET 10 to a back office via a cellular network 22 or via the internet over wireless network, such as by a WiFi connection to a router connected to the internet.

Figure 2:
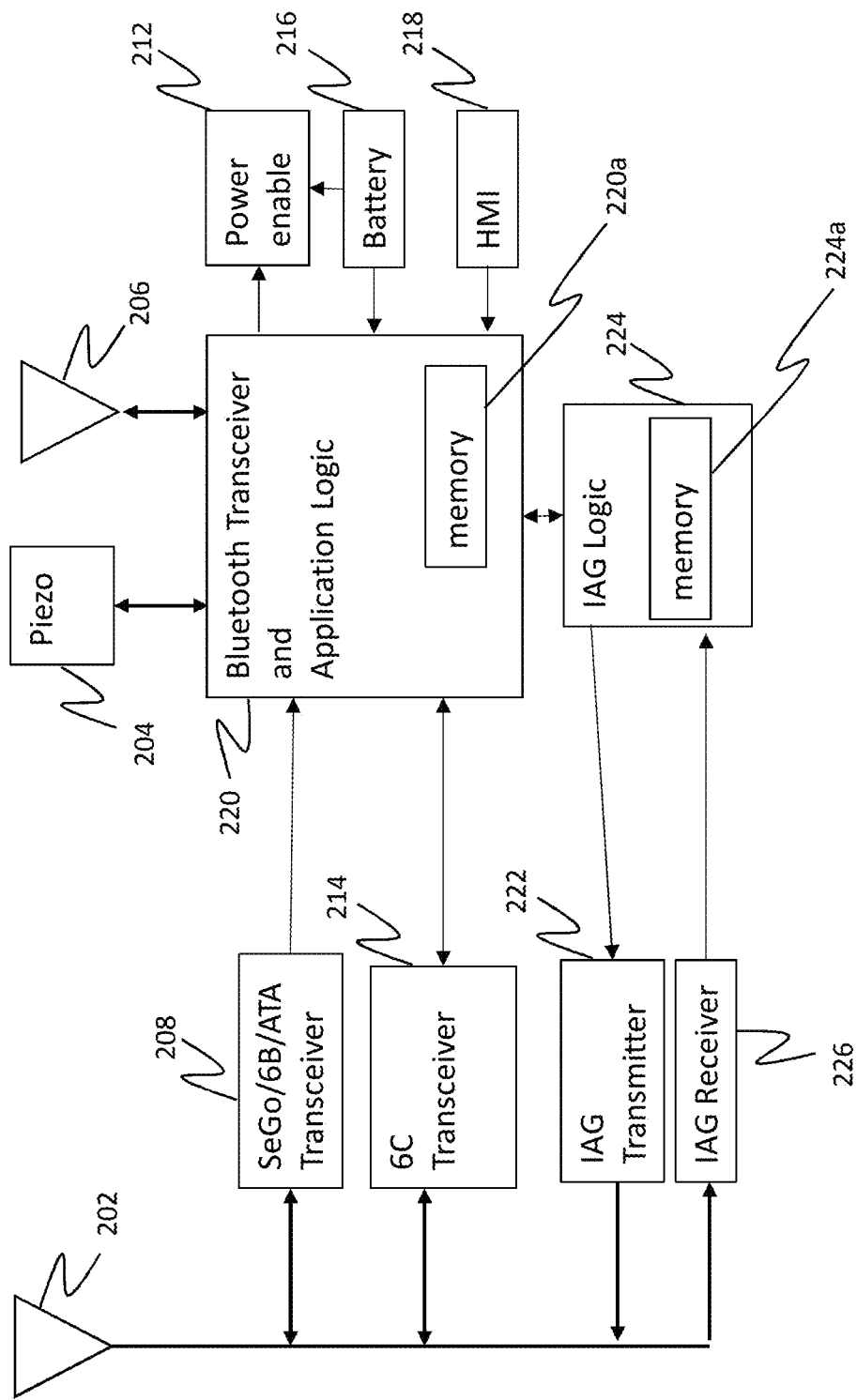
FIG. 2 is a block diagram of an exemplary multi-protocol BLEET.

FIG. 2 is a block diagram of an exemplary multiprotocol BLEET 10. The BLEET 10 includes a first transceiver 208 for the SeGo®, ISO 18000-6B and Air Transport Association (ATA) backscatter RFID protocols. The first transceiver 208 may include a microcontroller and memory, which may include read only memory, read/write memory and non-volatile programmable memory. The BLEET 10 also includes a second transceiver 214 for the ISO 18000-6C backscatter RFID protocol. The second transceiver 214 may include a microcontroller and memory, which may include read only memory, read/write memory and non-volatile programmable memory. The BLEET 10 may also include an IAG protocol logic device or devices, an IAG transmitter 222 and an IAG receiver 226. The IAG logic device may include a microcontroller and memory, which may include read only memory, read/write memory and non-volatile programmable memory. The Sego/ISO 18000-6B/ATA transceiver 208, ISO 18000-6C transceiver 214 and the IAG receiver 226 and transmitter 222 may all connect to an antenna 202 that is compatible for the frequency of use for these protocols, which is typically around 914 MHz. The BLEET 10 further includes Bluetooth® transceiver and application logic 220, which may be incorporated in a single application specific integrated circuit (ASIC) or one or more ASICs, field programmable gate arrays (FPGAs), or discrete devices. The application logic may comprise data memory 220a. The Bluetooth® transceiver 220 may include a microcontroller and memory, which may include read only memory, read/write memory and non-volatile programmable memory. The Bluetooth® transceiver 220 is connected to an antenna 206 that is compatible for the Bluetooth® operating frequency, which may include 40 channels centered around 2.4 GHz. The Bluetooth® transceiver 220 may also be directly connected to a battery 216. The Bluetooth® transceiver 220 may further be connected to power enable circuitry 212, which may provide battery power to one or more devices in the BLEET 10, including the Sego/ISO 18000-6B/ATA transceiver 208, ISO 18000-6C transceiver 214, and the IAG receiver 226 and transmitter 222. The BLEET transceiver 220 may also be connected to a Piezo transducer 204. The Piezo transducer 204 may be used as an audio output under control of the BLEET transceiver 220. The Piezo transducer 204 may also be used as a vibration detector to sense vehicle motion and may further be used as an audio input device for voice commands processed by the BLEET transceiver 220. The BLEET transceiver 220 may also be connected to one or more human-machine interfaces (HMI) 218, which may include one or more switches for setting user-modifiable inputs. The switches may be contact switches, capacitive or magnetic field sensing devices such as Hall effect or magneto-resistive devices or optical inputs.

In embodiments described herein, a BLE enabled tag 10 is preferably configured to both send advertisements and beacons as described in the BLE 4.0 specification, which is incorporated herein by reference. This configuration allows a smart phone application to recognize and connect to the BLEET 10 when it detects the advertisement from the BLEET 10. This allows multiple functions of the smart phone application to communicate with the BLEET 10 and to receive and respond to commands and data, or to send commands and data to the BLEET 10, which enable the communication functions in the applications described herein.

In embodiments described herein, a BLEET 10 may initiate command or data exchange with a smart phone application, such that even if the smart phone 20 is in a sleep mode and/or the smart phone application for connecting with the BLEET 10 is operating in the background of the phone operating system, communications between the BLEET 10 and smart phone 20 can proceed. To initiate such a function, the BLEET 10 must operate in a mode to send a beacon message which can wake the phone and start the smart phone application in the background of the operating system. In order to perform this function, an iBeacon, a specific BLE message defined by the Apple Inc., may be used as it will enable the above described action in both iOS® and Android® operating system based smart phones. However, other beaconing signals may be used in other implementations.

In a mode where the BLEET 10 initiates communication with a smart phone, a smart phone application can be awoken by a BLEET 10 and perform its required tasks to support the applications described herein without the need for any user intervention. This ensures that drivers are not required or tempted to manipulate the smart phone 20 while driving, thus the applications described herein are implemented such that they do not cause or contribute to distracted-driving. Applications described herein that require user interaction with the smart phone 20 are designed to be used when the vehicle is not moving. To avoid tempting a driver to interact with the smart phone application while operating the vehicle, the application itself can lock out functions by sensing motion using either Global Positioning System (GPS) circuitry in the smart phone, s motion sensor/accelerometer in the phone, or via a motion sensor such as the Piezo transducer 204 in the BLEET 10 where that sensor's status is checked by the smart phone application via the Bluetooth® link.

Definitions: the following terms are used throughout the written description.

ECDSA—Elliptic curve digital signal algorithm is a cryptographic algorithm used to authenticate data by signing the date with a public key and verifying the signature with a public key.

BLOB—Binary Large Object, a collection of binary data stored as a single entity.

The BLOB may be used primarily to hold data objects such as message IDs/Commands, Transponder IDs, Nonce, and security keys.

UUID—Universally Unique Identifier, software-accessible value that uniquely identifies an individual physical transponder, loaded on transponder at manufacture.

Root Nonce—Random value that prevents replay attacks, generated by transponder each time a Root Command or Manufacturing Command is verified.

User Nonce—Random value that prevents replay attacks, generated by transponder each time a User Command or Manufacturing Command is verified.

$MKey_{priv}$ and $MKey_{pub}$—Private and public Manufacturing Keys, which are unique per manufacturer, private key stored securely at manufacturer, public key is coded into each transponder's firmware, generated once on secure host before manufacturing begins.

$RKey_{priv}$ and $RKey_{pub}$—Private and public Root Keys, which are unique per back office, private key stored securely at back office, public key is coded into each transponder's firmware, generated once on secure host before manufacturing begins.

$UKey_{priv/UUID}$ and $UKey_{pub/UUID}$—Private and public User Keys, which are unique per UUID, copy of private key stored securely on each client application logged in as user with permission for given UUID, public key loaded once on Transponder with given UUID when signed by $RKey_{priv}$, generated at back office each time given UUID/user combinations change, superseding old key pair $CKey_{priv/UUID}$ and $CKey_{pub/UUID}$—Private and public Cache Keys, which are unique per UUID, private key discarded after cache commands are signed, copy of signed cache commands stored securely on each client application logged in as user with permission for given UUID, public key loaded once on transponder with given UUID when signed by $RKey_{priv}$, generated with cache commands at back office each time given UUID/LocalID combinations change, superseding old keypair and cache commands.

$TKey_{priv/UUID}$ and $TKey_{pub/UUID}$—Private and public transponder Keys, unique per UUID, private key loaded on transponder at manufacture when signed by $MKey_{priv}$, public key stored at manufacturer and sent to the back office, generated once at manufacturer when Transponder is manufactured.

$CAKey_{priv}$ and $CAKey_{pub}$—Private and public Customer Access Keys, copy of private key stored securely on each end user (i.e. Customer) application logged in as an end user (i.e. Customer) with permission for given Customer Access key loaded once on Transponder with given UUID, generated by the end user (i.e. Customer) application given user combinations change.

Signed Hash—a digital signature generated via a mathematical scheme for presenting the authenticity of the digital messages. A valid digital signature gives a recipient reason to believe that the message was created by a known sender (authentication), that the sender cannot deny having sent the message (non-repudiation), and that the message was not altered in transit (integrity).

User Command Service (UCS)—is used by the Client Application to send commands to the transponder.

User Return Status (URS)—is used by the Client Application to verify the status of the user command that was sent with in a previously written User BLOB.

In an exemplary embodiment, the BLEET 10 uses public/private key security to communicate with the client application and with roadside tolling equipment. FIGS. 3A and 3B illustrate an exemplary signal flow diagram (also referred to herein as use case diagram) showing a factory set-up of a BLEET 10 with security keys and identification data. The use case diagram refers to four entities involved in the transactions: the tolling authority back office 17 where tolling transactions are processed and identification data for tolling tags including BLEETs is associated with user information, which may include toll payment means, driver identification and vehicle identification; the client application 21, which may be hosted on a mobile phone (e.g., smart phone 20) or in the case of factory set-up, on a computer or custom hardware designed for mass production; the Bluetooth® LE transceiver and application logic 220 and the BLEET tag itself 10, which contains the Bluetooth® LE transceiver and application logic 220. For this operation, assume that an exemplary manufacturing set-up locates the BLEET 10 approximately one meter from a Bluetooth transceiver antenna for the client application.

At block 302 of the manufacturing set-up, the client application 21 generates a universally unique identification (UUID) for the BLEET 10. In connection with the UUID, the client application 21 generates a public Tag Key ($TKey_{pub/UUID}$) and a private $TKey_{priv/UUID}$. At block 306, the client application retains the UUID and the $Tkey_{pub/UUID}$. At block 304, the Bluetooth® LE transceiver (BLE) 220 is preloaded with a public root key $RKey_{pub}$ and a public manufacturing key $MKey_{pub}$. At block 308 an initial client/transponder Bluetooth® LE connection is made. Details of an exemplary initial client/BLEET connection are described in FIG. 3C. At block 310, the client application 21 sends a "Load TKEY and $Tkey_{priv}$" command to the BLE. The command is signed with the $MKey_{priv}$. At block 312, the "TKey" is written to the BLE 220 via a manufacturing BLOB (Man. BLOB). At block 314, the Tkey is validated with the $MKey_{pub}$ that is stored in the BLE. At block 316, the BLE stores the private TKey, $TKey_{priv}$. At block 318, a MRS message (Manufacturing Return Status) is created by the BLE 220 and signed with the $TKey_{priv}$. At block 320, the BLE 220 sends the MRS to the client application 21 via the Bluetooth® LE connection. At block 322, the client application 21 validates the MRS using the $TKey_{pub}$. A message number count that is incremented by the transponder logic as a housekeeping function may also be verified at this time. At block 324, the client application 21 sends the UUID and the $TKey_{pub/UUID}$ to the back office 17. At block 326, the client application 21 and the BLE 220 disconnect. At block 328, the BLE 220 resumes advertising mode. IDs sent to the tag can be encrypted with symmetric (such as AES) or public key cryptography such as elliptical curve algorithms (e.g., ECDSA). In further embodiments, the ID may be encrypted periodically (e.g., once per day) to create daily IDs that appear different every day but still link to the same account. The date may be part of the encrypted ID so that the back office 17 can recognize the tag even though the date portion of the encrypted ID changes in the user ID each day. Daily encryption limits the value of stolen IDs to a single portion of the day. Such encryption may be done by minute or hour, or any time within a synchronized time frame if the reader, tags and toll system.

Figure 3C:
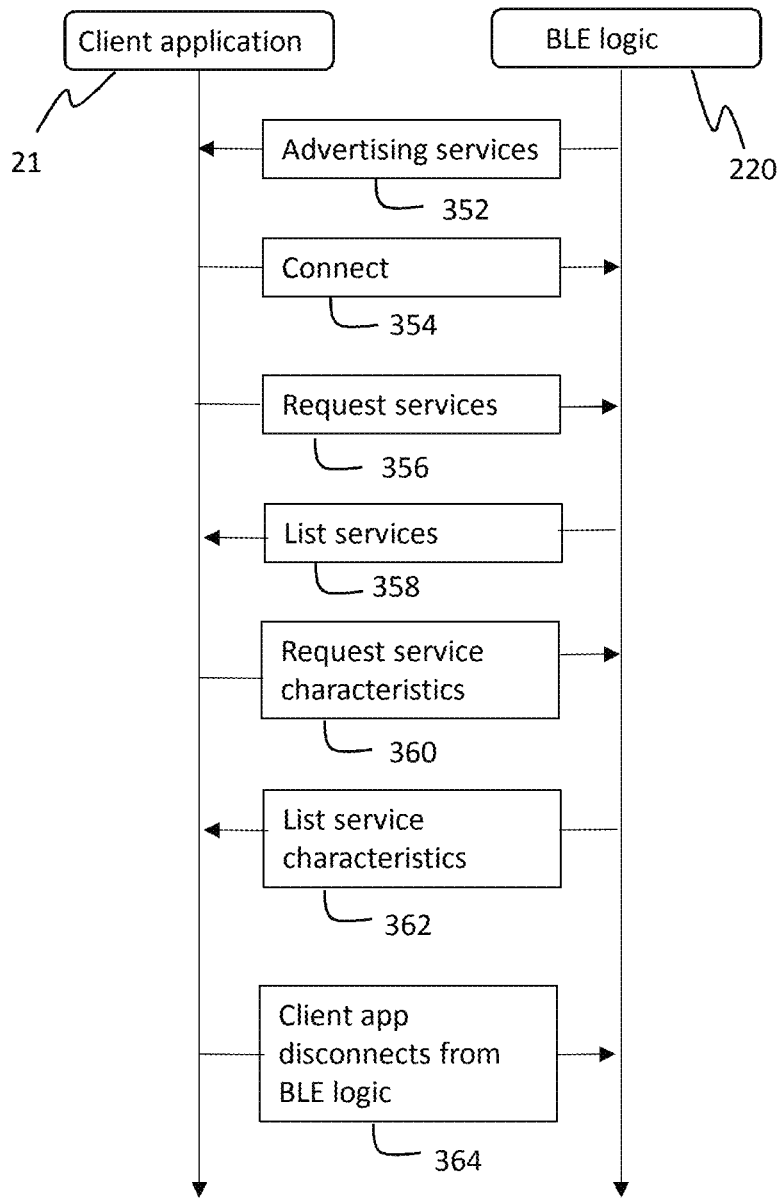
FIG. 3C is an exemplary signal flow diagram of an initial connection between a smart phone and an exemplary BLEET.

FIG. 3C is a use case diagram describing an exemplary initial connection sequence between a mobile phone client application 21 and the BLE logic 220 of a BLEET 10. A User will pair his/her phone with the BLEET 10 to prevent unwanted access to ID and other tag information. The user will use an assigned tag ID when creating his/her toll account to pair the tag with their account information. When the user uses his/her phone to connect to the tag, the BLEET application will automatically compare the ID information on the tag to the ID information on the user account. If the IDs match, the phone will be granted access to the secure BLE features on the tag. A software and/or hardware reset will be available to assign tags to new owners/users.

At block 352, the BLEET 10 broadcasts an advertising services message. This is a standard function of Bluetooth® LE devices known to those skilled in the art. At block 354, the mobile phone client 21 receives the advertising services message and the client application 21 establishes a connection with the BLE logic 220. At block 356, the client application 21 sends a request of services message to the BLE logic 220. At block 358, the BLE logic 220 sends a list of available services. At block 360, the client application 21 sends a request for a list of characteristics for a particular service. At block 362, the BLE logic 220 sends a list of characteristics for that service. Blocks 360 and 362 may be repeated for as many services that are available to return characteristics for all services. At block 364, the initial connection sequence ends.

Figure 4A:
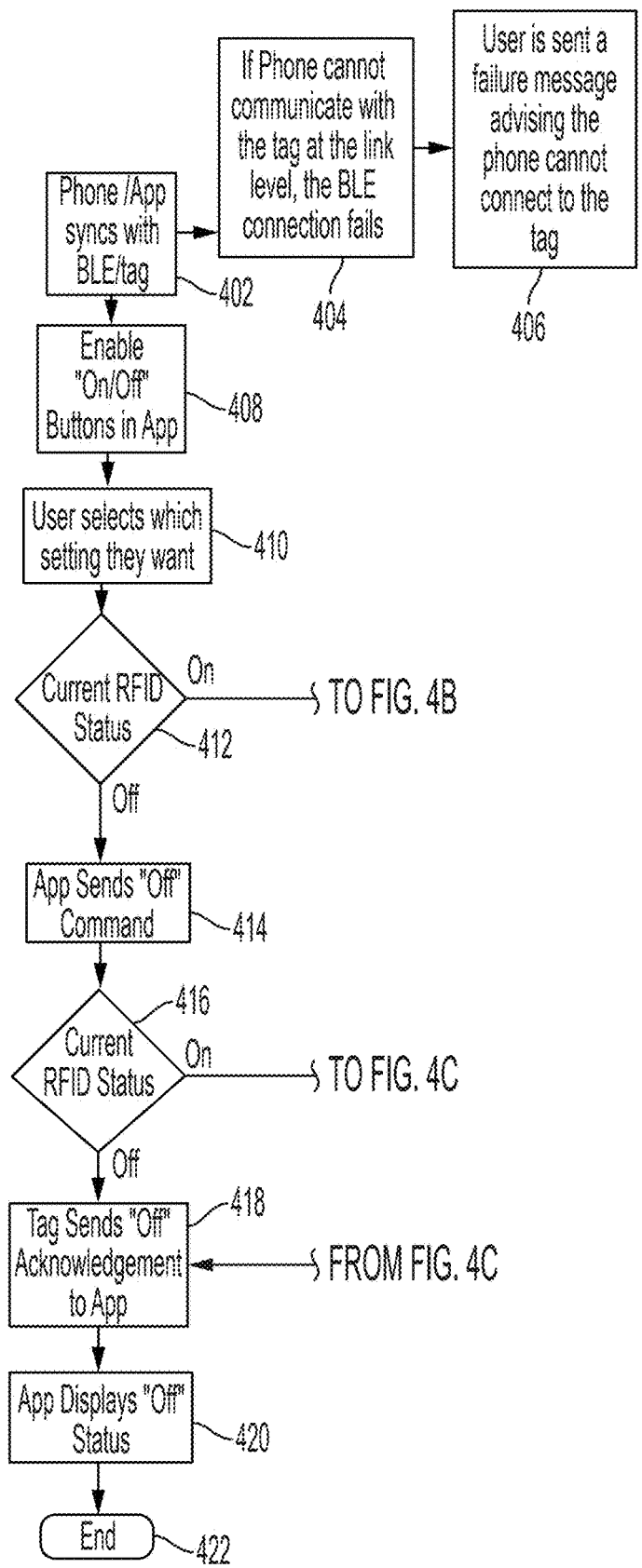
FIGS. 4A, 4B and 4C are exemplary flow diagrams of a BLEET tag power on and off sequence between a smart phone and an exemplary BLEET.
Figure 4B:
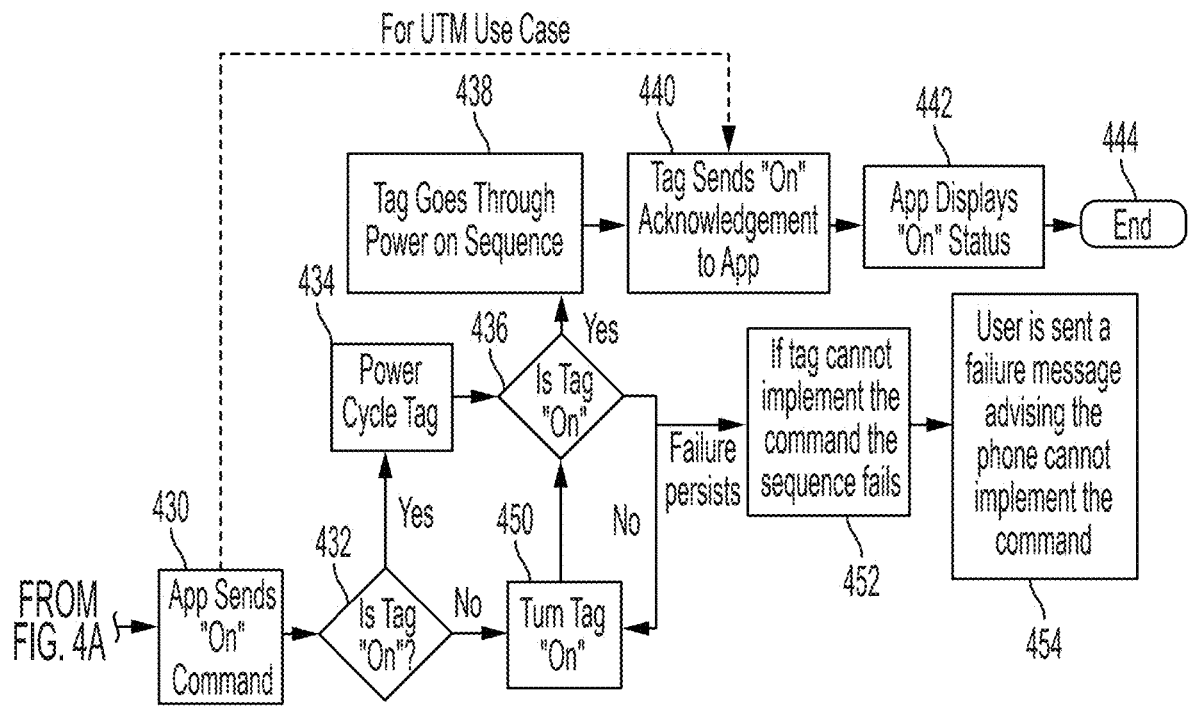
Figure 4C:
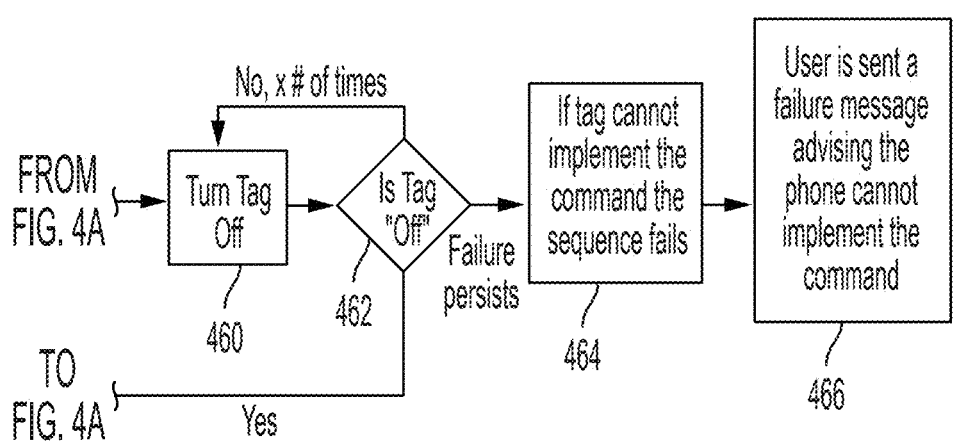

FIGS. 4A, 4B and 4C are exemplary flow diagrams of an initial power on sequence for a BLEET. This use case will turn the BLEET 10 On/Off (either soft or hard) so the transponder will or will not respond when in the reading zone of a RFID system. The BLE logic may always be powered regardless of tag "on" or "off" status. Thus, the tag can always communicate over the Bluetooth® LE connection with a client application assuming the tag has sufficient battery power and the BLE logic is functioning correctly. The following assumptions are made for the use case illustrated in FIGS. 4A-4C: proximity one meter from phone to transponder, this will be controlled by RF transmitter levels and/or received signal strength indicator (RSSI) levels. Within the transponder, the BLE microprocessor (μP) will get and maintain Tag states on power up (either soft or hard). If the transponder status has been set to "off," the transponder will not communicate via the RFID interface. If the transponder status has been set to "on," the transponder will communicate via the RFID interface.

Consistent with embodiments described herein, a BLEET may allow reprogramming of the toll tag by the tag owner. An owner of a vehicle and tag might move from the region of one toll authority to another, and may wish to close the tolling account from their previous location and open an account in their new location. Rather than having to dispose of the old tag, and purchase a new one, the owner's phone can pair with the BLEET, remove the tag ID of the old tolling account, and upload the tag ID of his/her new account.

Consistent with embodiments described herein, a BLEET may allow the user to disable the toll tag. Instances arise where people have a toll tag in their vehicle, but do not wish to use their tolling account and instead prefer to pay cash at toll booths. Such scenarios arise when people loan their vehicles to others, or use their vehicles for business purposes, and prefer to keep personal and business tolling expenses separated. In addition, the BLEET may be configured to be disabled unless a validated user's smart phone running a client application to access the BLEET is in the vehicle.

Consistent with embodiments described herein, a BLEET may allow the user to reset or 'wipe' a toll tag. If a person sells a vehicle in which a toll tag is permanently mounted, the seller can simply remove their personal account information from the tag using a paired smart phone app. Subsequently, a new owner of the vehicle does not need to purchase a new tag, he/she can pair their smart phone to the tag and upload their account credentials.

As shown in FIGS. 4A, 4B and 4C, at block 402, the mobile phone client application 21 syncs with the BLEET's BLE logic 220. An exemplary initial transponder to client application transaction is described in FIG. 3C. Block 404 and 406 describe the exception case where a connection between the client application and the BLEET 10 cannot be established. If the client application 21 cannot connect to the BLE logic 220, then at block 404, the BLE connection is determined by the client application 21 to have failed. In this case, at block 406, the client application 21 displays a message to the user that the smart phone 20 cannot connect to the BLEET 10. In the case where a connection between the client application 21 and the BLEET 10 is made, at block 408, the tag "On/Off" buttons are enabled on a user display in the client application 21. At block 410 the user selects tag setting of "on" or "off" on the client application 21. Block 412 is a branch depending on the current status of the tag. If the user selected to turn the tag on, then at block 430, the client application 21 sends the Bluetooth® LE connection and "on" command. If the tag is already in the on state, as determined at block 432, then at block 434, the tag is power cycled. At block 436, it is determined if the tag is in the on state. The determination may be made by reading a logic signal level from one or more of the tag's RFID transceivers 208, 214 or the IAG logic 224. If the tag is in the on state then at block 438, the tag executes a power on sequence. Then at block 440, the tag sends an "on" state acknowledgement to the client application 21 over the Bluetooth® LE link. At block 442, the client application 21 displays that the tag is in the "on" state and at block 444 the RF Power On/Off sequence ends. If, at block 436, the tag did not enter an on state after a predetermined number of attempts, then a failure exists and at block 452, the power on/off sequence is considered to have failed and the client application 21 send the user a failure message at block 454 stating that the tag cannot be turned on.

If, at block 432, the tag was in the "off" state, then at block 450, the tag is turned on. If the tag is in the on state then at block 438 the tag executes a power on sequence. Then at block 440, the tag sends an "on" state acknowledgement to the client application 21 over the Bluetooth® LE link. At block 442 then the client application 21 displays that the tag is in the "on" state and at block 444 the RF Power On/Off sequence ends. If, at block 436, the tag did not enter an on state after a predetermined number of attempts, then a failure exists and at block 452, the power on/off sequence is considered to have failed and the client application 21 sends the user a failure message at block 454 stating that the tag cannot be turned on.

If at block 410 the user selected the power off option in the client application 21, then at block 414, the client application 21 sends via the Bluetooth® LE connection an "off" command. If at block 416, the current status of the tag is on, then at block 460, the tag is turned on. If at block 462 the tag does not enter the off state after a predetermined number of attempts, then a failure exists and at block 464, the power on/off sequence is considered to have failed and the client application 21 sends the user a failure message at block 466 stating that the tag cannot be turned on. If at block 416 or at block 462 the tag is determined to be in an off state, then at block 418 the tag sends to the client application 21 via the Bluetooth® LE connection a tag "off" state acknowledgement. At block 420, then the client application 21 displays a tag "off" status and at block 422 the power on/off sequence ends.

Figure 5A:
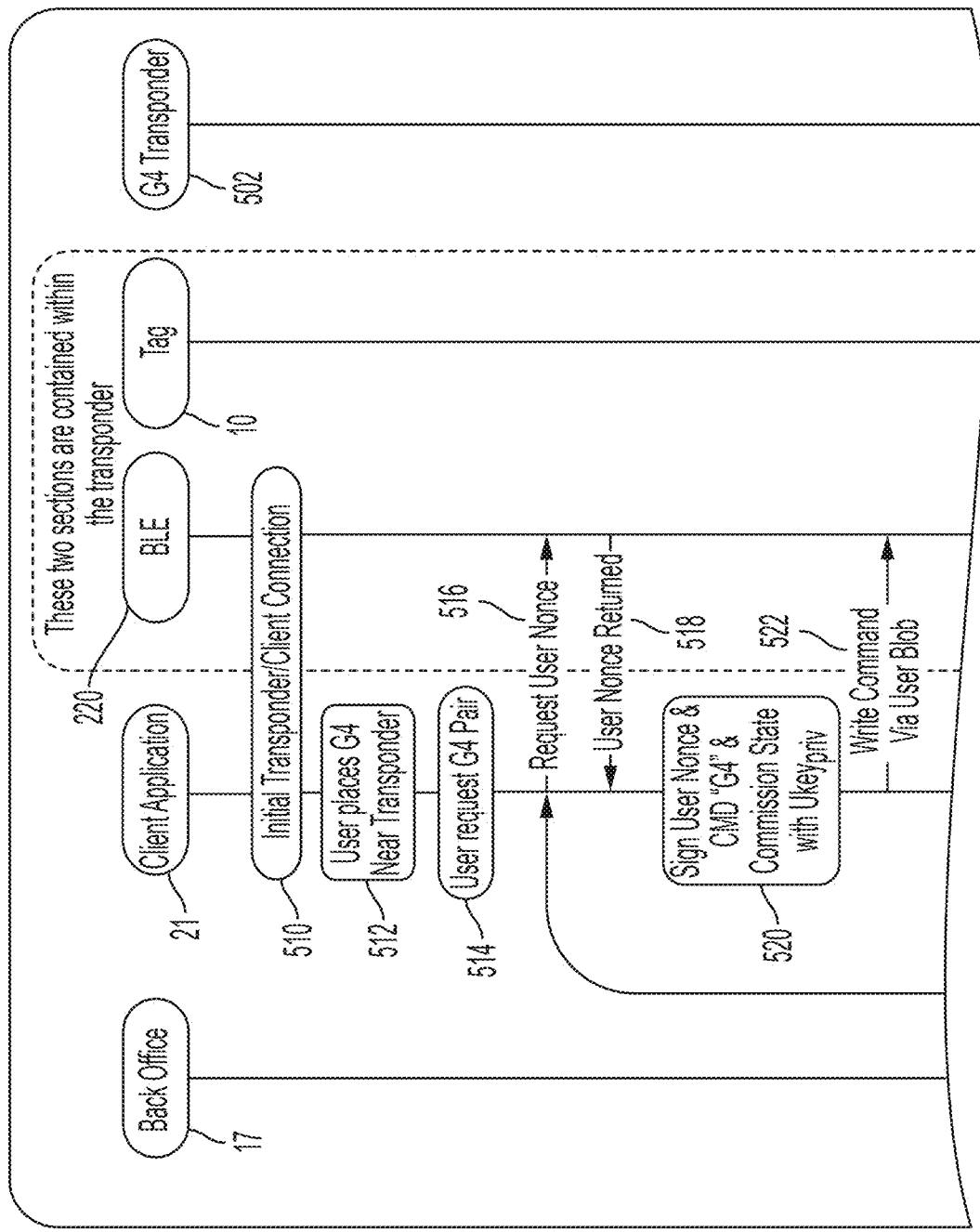
FIGS. 5A and 5B are exemplary signal flow diagrams of connection between a smart phone, an exemplary BLEET and a G4 tag for cloning the G4 tag information onto the BLEET.
Figure 5B:
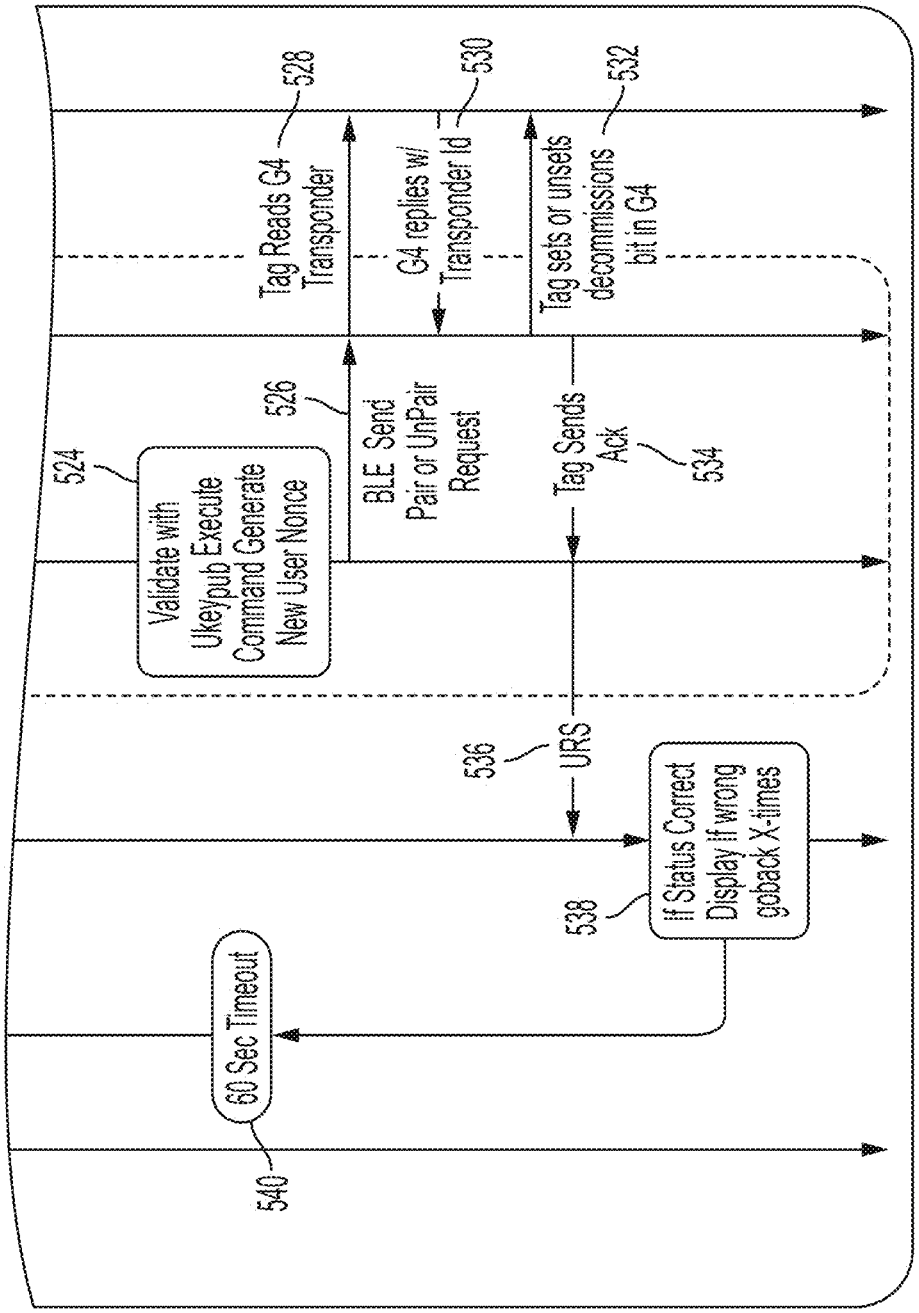

There are presently multiprotocol transponders assigned to users that do not have Bluetooth® capability. In some instances, it may be advantageous for users to be able to reassign identification information from these "legacy transponders" in an existing transponder to a new Bluetooth® enabled transponder. FIGS. 5A and 5B are an exemplary use case diagram for "cloning" the data of an existing multiprotocol transponder into an exemplary BLEET 10. The five entities involved in the use case are the back office 17, the smart phone client application 21, the BLE logic in the BLEET tag 220, the BLEET tag itself 10, which represents transaction electronics including the transceivers for the various protocols described herein and an exemplary legacy "G4" transponder 502.

At block 510 an initial BLEET/client application connection is made. This connection may correspond to the connection flow described in FIG. 3C. At block 512 the user locates the G4 transponder in proximity to the BLEET 10. At block 514, the user requests pairing with the G4 transponder on the client application 21. At 516, the client application 21 requests a user nonce from the BLE logic 220. At 518, the BLE logic 220 transmits the user nonce. At block 520 the client application 21 signs with the UKey$_{priv}$ the user nonce, a command to clone a tag, which may be the command "G4" and, where applicable, a toll commission location or state. At 522, the client application 21 sends to the BLE logic 220 the command constructed in block 520. At block 524, the BLE logic 220 validates the command with the UKey$_{pub}$ and, upon successful validation, executes the command and generates a new user nonce. At 526, the BLE logic 220 signals to the tag logic 10 a G4 Pair or Unpair request.

At 528, the tag logic 10 requests a read of the G4 transponder data. Communication between the BLEET and the G4 transponder is possible over the active protocol electronics in each tag because each tag can generate a modulated signal that can be received and read by the other tag.

At 530, the G4 tag 502 responds with its identification data and any other data requested by the BLEET tag 10. At 532, the BLEET transponder logic 220 transmits a message to the G4 tag 502 to either set or clear a decommissioning bit in the G4 tag. The G4 tag 502 may include a single decommissioning bit or multiple bits or data words that indicate to the G4 tag that it is active or decommissioned. The G4 tag may be re-read by the BLEET to confirm decommissioning. At 534, the BLEET tag logic 10 sends a confirmation to the BLE logic 220 that the commissioning or decommissioning of the G4 tag 502 is complete. At 536, the BLE logic 220 transmits a User Return Status URS message to the client application 21 confirming the commissioning or decommissioning of the G4 tag 502. At block 538, if the status returned from the BLE logic 220 to the client application 21 is correct, then the client application 21 displays the current status of the G4 tag 502 and the procedure is complete. If the status returned from the BLE logic 220 to the client application 21 is not correct, then at block 540 a time delay, which may be 60 seconds, is executed in the client application 21, after which the use case flow returns to 516 to re-attempt the G4 commissioning or decommissioning. The number of reattempts may be limited to a predetermined number of unsuccessful instances after which the client application 21 may indicate to the user that the requested commissioning or decommissioning of the G4 tag 502 was not successful.

Consistent with embodiments described herein, users of the BLEET 10 will be able to set the occupancy of their vehicle prior to driving on high occupancy vehicle (HOV), high occupancy toll (HOT) express lanes that require multiple passengers in a vehicle to allow driving on the HOV/HOT lanes or to drive on roadways free of charge or at reduced rates based on occupancy level. In an embodiment, a mobile phone 20 with the appropriate application will be able to pair with the BLEET tag 10 over the Bluetooth® LE connection and the phone will prompt the user to enter the occupancy level, which would then be set in the tag and transmitted to roadside equipment via the tag's transponder transceivers (e.g. FIG. 2, reference elements 208, 214, 222, 226). In a further embodiment multiple phones, each belonging to different people in the vehicle, all connect to or are visible to the BLEET tag 10 via the Bluetooth® LE connection at the same time. In this scenario, the tag 10 can automatically set occupancy level based on the number of phones detected. This automated setting may be overridden by the user with the phone application if needed. One advantage of using a smart phone application to set occupancy is that the phone can recognize an iBeacon (or similar beacon) when the phone enters or is proximate to the vehicle. Therefore, the beacon can start the smart phone application which can prompt the driver to enter in the currently correct occupancy level when the phone is safely parked. This notification of the user, combined with easy access to setting occupancy level may avoid the user having to change tag switch setting when the car in motion and reduce the chance of the driver being distracted while the vehicle is in motion.

FIGS. 6A and 6B are use case diagrams for setting occupancy level in a BLEET 10. The four entities involved in the use case are the back office 17, the smart phone client application 21, the BLE logic in the tag 220 and the tag 10 itself, which represents the electronics including the transceivers for the various protocols described herein. At block 602, an initial client application, BLE logic connection is made. In an exemplary implementation, the BLE logic connection is made in accordance with FIG. 3C. At block 604, the client application 21 displays the current occupancy setting or HOV/HOV status. At block 606, the user may enter a new HOT/HOV setting. At 608, the client application 21 requests a user nonce as defined earlier herein from the BLE logic 220. At 610, the BLE logic 220 returns a user nonce to the client application 21. At block 612, the user nonce, an occupancy command and an occupancy number setting are signed with the Ukey$_{priv}$. At 614, the command constructed in block 612 is sent to the BLE logic 220 via a user BLOB. At block 616 the BLE logic 220 validates the command with the UKey$_{pub}$ and generates a new user nonce. At 618, the BLE logic 220 updates the tag's tolling hardware with the new occupancy level. At 620, the tag's 10 tolling hardware acknowledges the updated occupancy level to the BLE logic 220. At 622, the BLE logic 220 sends a user return status URS to the client application 21. At block 624, the client application 21 verifies the housekeeping message number from the transponder logic. If the message number is correct, then at block 626, the client application 21 displays the updated occupancy level. If the message number is not correct, processing returns to 608. This cycle may repeat a predetermined number of times, after which, a correct message number is not returned, the client application 21 displays that the update of occupancy status failed.

Figure 6C:
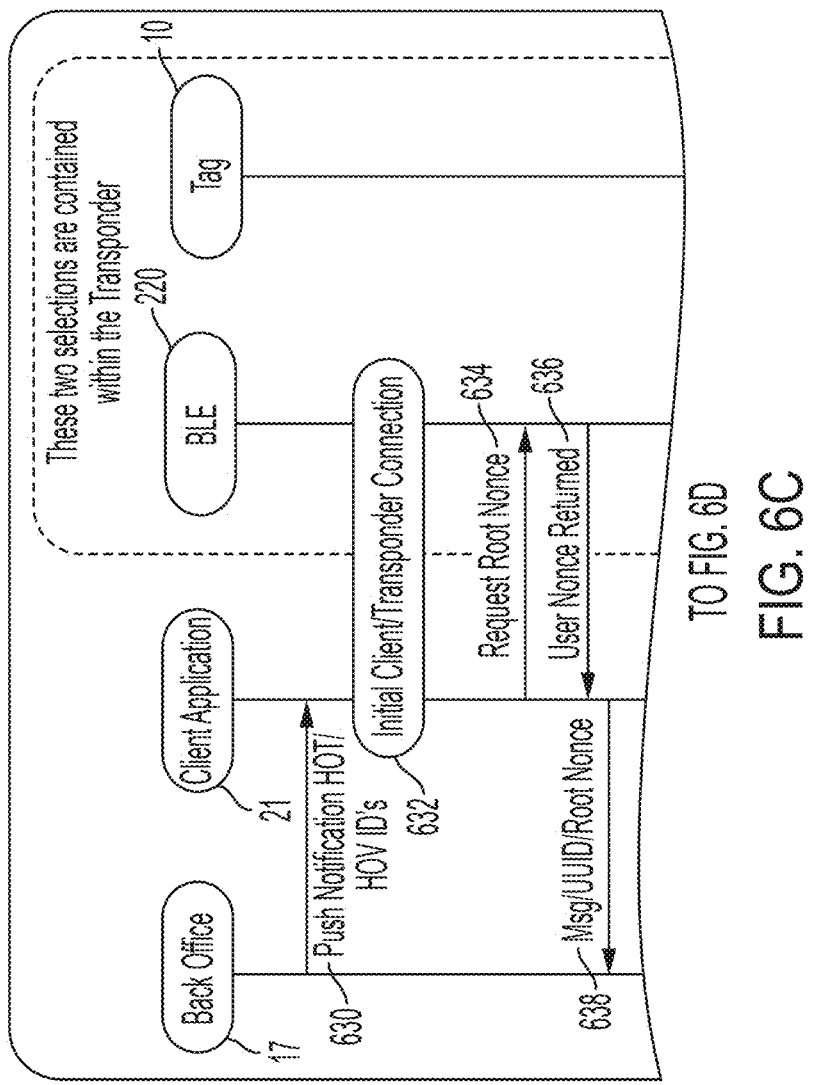

FIGS. 6C and 6D are an exemplary use case diagram for the back office push of HOT/HOV ID's to the BLEET by the root security method. The back office push of the HOT/HOV identification numbers is an exemplary way to maintain security of the identification numbers. The four entities involved in the use case are the back office 17, the smart phone client application 21, the BLE logic in the tag 220 and the tag itself 10, which represents the tool transaction electronics including the transceivers for the various protocols described herein. At 630, the back office send a push notification to the client application via the cellular network of the new HOT/HOV identification numbers. At block 632 the client application 21 initiates a connection with the BLEET's BLE logic. At 634 the client application 21 requests a Root Nonce from the BLE logic. At 636 the BLE logic returns a Root Nonce to the client application 21. At 638 the client application 21 sends a message to the back office comprising the UUID and the Root Nonce. At block 640 the back office signs the Root Nonce, the command "Occ. ID's" and the HOT/HOV identification numbers with the $RKey_{priv}$ to create a Root BLOB. At 642 the back office sends to the client application via the cellular network the signed Root BLOB constructed in block 640. The client application forwards this to the BLE logic. The BLE logic validates the signed Root BLOB with the $RKey_{pub}$. At block 646 the BLE logic, assuming success of the validation, sends the HOT/HOV IDs in the tag's RFID logic memory (e.g. FIG. 1, 224*a*), where they will be used in tolling/HOT lane transactions. At block 648 the BLE logic signs the Root Nonce and an acknowledge message with the $TKey_{priv}$. At block 650 the signed message is returned to the client application 21 as an RSS, which the client application 21 then forwards to the back office at block 652. At 652 the back office validates the RSS with the $TKey_{pub}$, verifies the activated status of the HOT/HOV ID's and updates a transponder ID database. At block 656 the client application and BLE logic disconnect, ending the HOT/HOV ID push process.

One issue with occupancy setting for toll transponders is the user setting the occupancy level while driving, either because the user forgot to set the correct setting prior to departure or because the user may fraudulently declare a false occupancy status at toll transaction gantries or express lane entrances and then reset the occupancy status to avoid detection by highway police or other enforcement means. A transponder may be fitted with a motion sensor designed to detect when the vehicle is in motion. Such motion sensors are well known in the art, for example, but not by way of limitation, the motion sensor part number MVS0409.02 manufactured by Sensolute. Motion detection by the transponder may be used to lock out changes of occupancy status, regardless of switch setting. The lock out may be programmed in the client application to extend for a predetermined period of time after motion detection has ceased, to reduce the likelihood that the driver may still be in active traffic and attempting to change HOV/HOT settings even if momentarily stopped. Alternatively, the phone may have its own motion sensor or sensors, including one or more accelerometers or may detect motion by use of global satellite positioning (GPS) assuming the phone is equipped to receive GPS signals. Thus, the client application may determine motion either via the phone alone, via the tag's sensor or may compare motion information from phone and tag resources. In a further embodiment, the smart phone or the BLEET may receive motion information from a vehicle sensor.

Tags with switches that allow manual selection of occupancy declaration by the driver are currently in use. Some tolling agencies may wish to continue to use "switch tags" as they are known. A BLEET tag may include manual switches, see FIG. 2. "HMI" 218. In this case, the smart phone client application 21 may be awakened by an iBeacon (or similar beacon) and can then look for the advertising mode of the BLEET switch tag, and connect to the client application 21 to determine the settings of the switches for the purpose of any toll collection in a HOT/HOV system. The smart phone application 21 may then detect the whether the vehicle is in motion and then send a command to the BLEET switch tag to freeze occupancy settings.

Alternatively, regardless of whether the tag is Bluetooth® enabled or not, the motion sensor in the tag described above can detect vehicle motion and the "freeze out" switch functions of the tag can be activated such that the data sent to the reader does not change until the vehicle is once again stopped and the motion sensor no longer senses motion. In another alternative, both sensors (tag motion and phone motion) could be used where the data is sent from the motion sensor in the phone to the tag and used by the tag logic or processor in combination with the tag motion sensor data to determine if the vehicle is in motion, and the freeze out switch changes while the vehicle is in motion. In another alternative, the reverse operation may be performed in which the tag sends motion sensor data to the phone. This will encourage and train drivers to make occupancy selection while stopped rather than when moving, resulting in a reduction in driver distraction burden.

Consistent with embodiments described herein, the mobile phone client application may use biometric information a part of entering occupancy level. A scan of biometric features of the occupants in the vehicle by a smart phone's camera may be used to prevent the user from fraudulently claiming more passengers than are actually in the vehicle.

Switch tags are often used to declare the occupancy of a vehicle for toll collection and traffic management purposes. The toll charge is usually higher for single occupant vehicles, lower for dual occupant vehicles, and even lower or zero for triple occupant vehicles (known as HOT/HOV lanes). However, since there are currently no highly reliable systems for detecting the occupancy status from outside the vehicle by automated means, enforcement of the proper switch position to the actual occupancy depends on police spot checks. For an unscrupulous person who wishes to evade tolling, for example as a single occupant, that user could leave the switch in the proper single position at almost all times thus passing any spot checks. However, in reality it is quite easy, with current switch tags, for a driver to look for spot checks as he/she approaches the gantry, and if none are present to switch the tag to an HOV position before the tag goes under the gantry, then switching it back again after the vehicle passes the gantry. In this way users can skirt the tolls that are due, defeating the entire purpose of the HOT lane system with virtually no chance of being caught or fined. The motion sensor enabled tag as described prevents this kind of abuse, because the driver will not be able to switch occupancy level "on the fly" and this makes spot checking of actual occupancy versus switch position much more effective. In a further aspect of the invention, the above-described user input freeze functions may be enabled a predetermined time after the vehicle has entered a toll road.

Figure 7A:
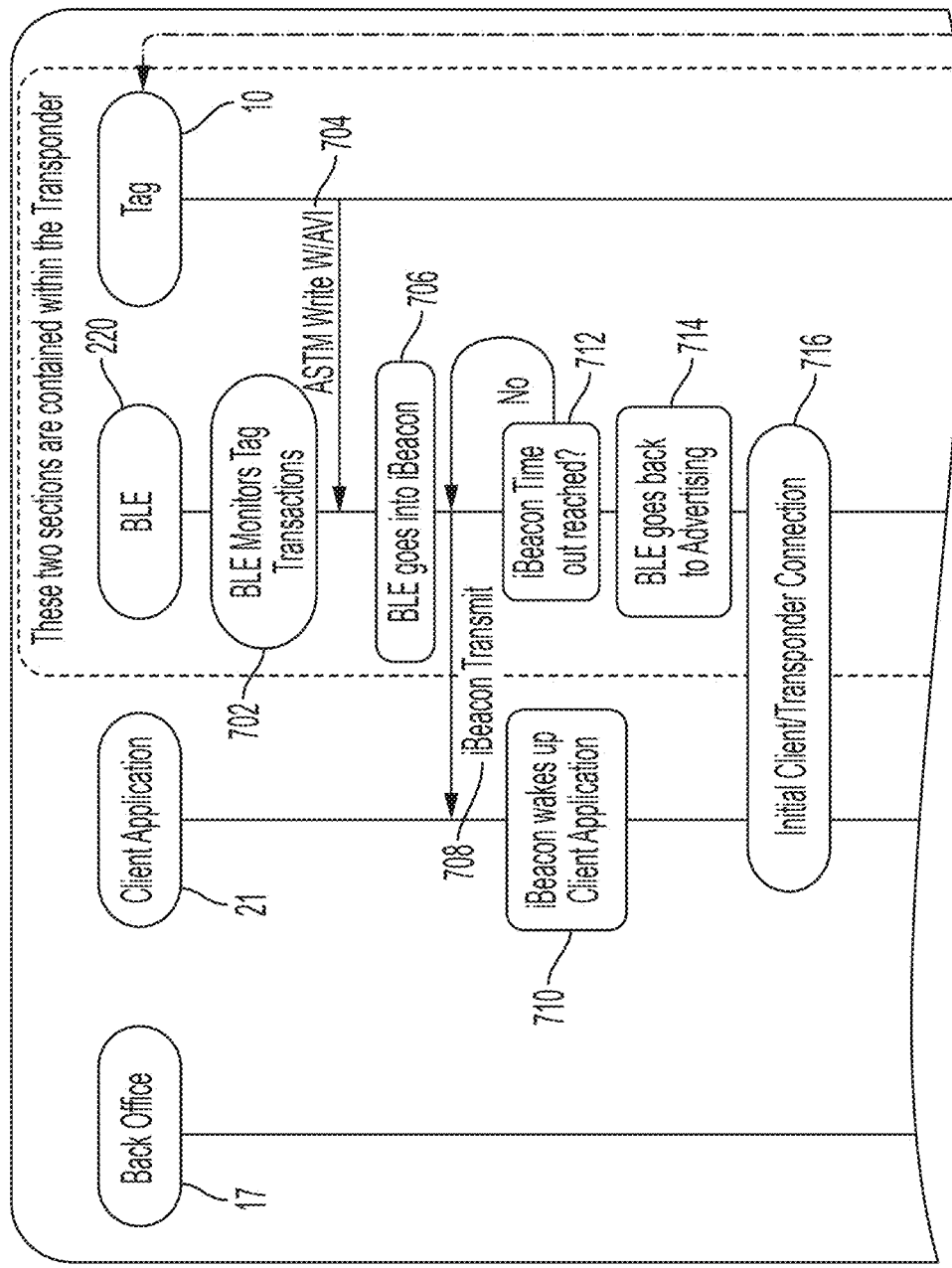
FIGS. 7A and 7B are exemplary signal flow diagrams for audio visual data alerts between a BLEET and a smart phone.
Figure 7B:
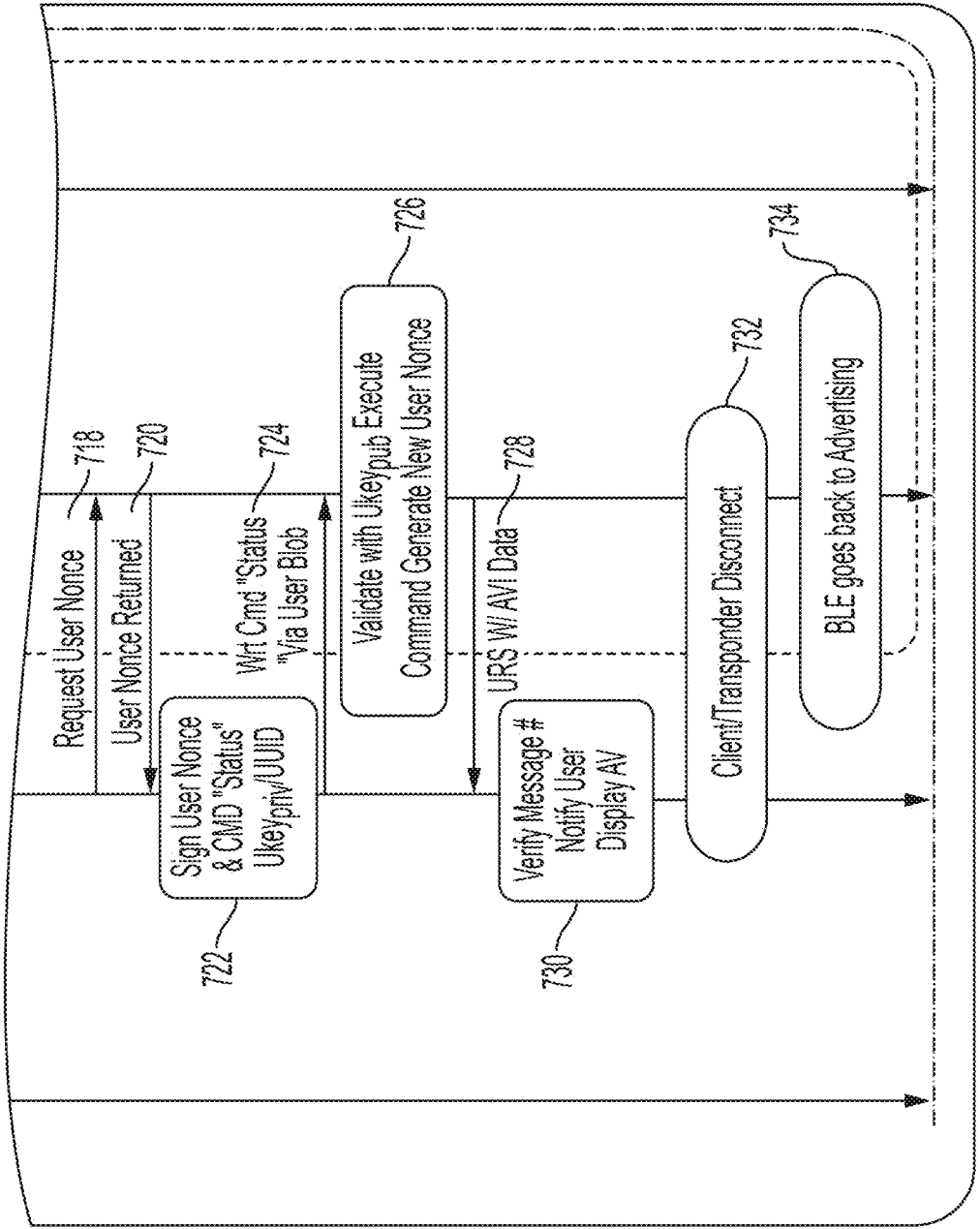

FIGS. 7A and 7B are use case diagrams for audio visual data alerts between a BLEET 10 and a smart phone 20. A BLEET 10 enables the ability to deliver messages to vehicle drivers. RFID readers may be located at strategic areas along roadways to push messages via RF to drivers that have a BLEET 10 and a paired smart phone 20 or through the vehicle's paired Bluetooth® system and human interface, such as voice and a heads-up-display. The roadside equipment transmits a message to the BLE toll tag in the vehicle, and the tag can then forward that message to the driver's paired smart phone 20, or to the vehicle itself via BLE. Messages may include, for example special traffic conditions, road closures, detours, construction or accidents ahead. While variable letter signs overhead broadcast their information to every car that passes by, RFID messages can be targeted to specific vehicles. In temporary situations such as high cross wind, or permanent situations such as low bridge warnings, it might be appropriate to only send messages to Semi trailer trucks to lower their speed or use detours. Individual tolling customers can be notified about any issues with their account such as insufficient funds, declined credit cards or returned checks. Standards-making organizations that have established data protocols for roadway messaging include the American Society for Testing and Materials (ASTM) and the Commercial Vehicle Information System Network (CVISN).

As shown in FIGS. 7A and 7B, the four entities involved in the use case are the back office 17, the smart phone client application 21, the BLE logic in the tag 220 and the tag itself 10, which represents the electronics including the transceivers for the various protocols described herein. At block 702, the BLE logic 220 monitors the tag logic any incoming messages from the tag toll transceivers. At 704, if the tag 10 received a message via one of the toll transceivers, that message is transmitted to the BLE logic 220. At block 706, the BLE logic 220 begins transmitting an iBeacon mode or other beacon. At 708, an iBeacon or other beacon is transmitted. At block 710, the client application 21 is woken up by the beacon. At block 712, the beacon mode ends after a predetermined amount of time. At block 714, the BLE logic 220 resumes advertising mode. At block 716, in response to reception of the beacon, the client application 21 initiates an initial client/transponder connection. An exemplary such initial connection is described in FIG. 3C. At 718, the client application 21 requests a under nonce. At 720, the BLE logic 220 transmits a user nonce. At block 722, the client application 21 signs the user nonce and a command to return "status" with the UKey$_{priv/UUID}$. At 724, the client application 21 transmits the command "status" as constructed in block 722 via a User BLOB. At block 726, the BLE logic 220 validates the command with the UKey$_{pub}$. If the command is validated then the BLE logic 220 generates a new user nonce and executes the command by retrieving the incoming message data from the BLE memory (e.g., memory 220A). FIG. 7B refers to this data as AVI data (automated vehicle information), but it may be any of a variety of protocols. At 728, the BLE logic 220 transmits a URS containing the incoming data message. At block 730 the client application 21 verifies the URS message number and if the verification is correct, displays the message that the tag logic received. Display of the message may be directly on the smart phone 20 and may be accompanied by a text to audio broadcast by the smart phone 20 so that the user does not have to look at the smart phone while driving. The smart phone 20 may also be relay the message to other devices in the vehicle, for example a dashboard display, a head up display, a text to voice audio message or any combination of the above. The smart phone 20 may add information to the message that is related to the message and include the additional information in its display, audio broadcast or relay to other devices. For example, an incoming message regarding road surface conditions may be enhanced by the smart phone by accessing weather conditions and including additional weather information for the user. The smart phone 20 may also use the message information to re-route a navigation the smart phone is executing.

At block 732 the client application 21 and the BLE logic 220 disconnect. At block 734 the BLE logic 220 resumes advertising mode.

Figure 8A:
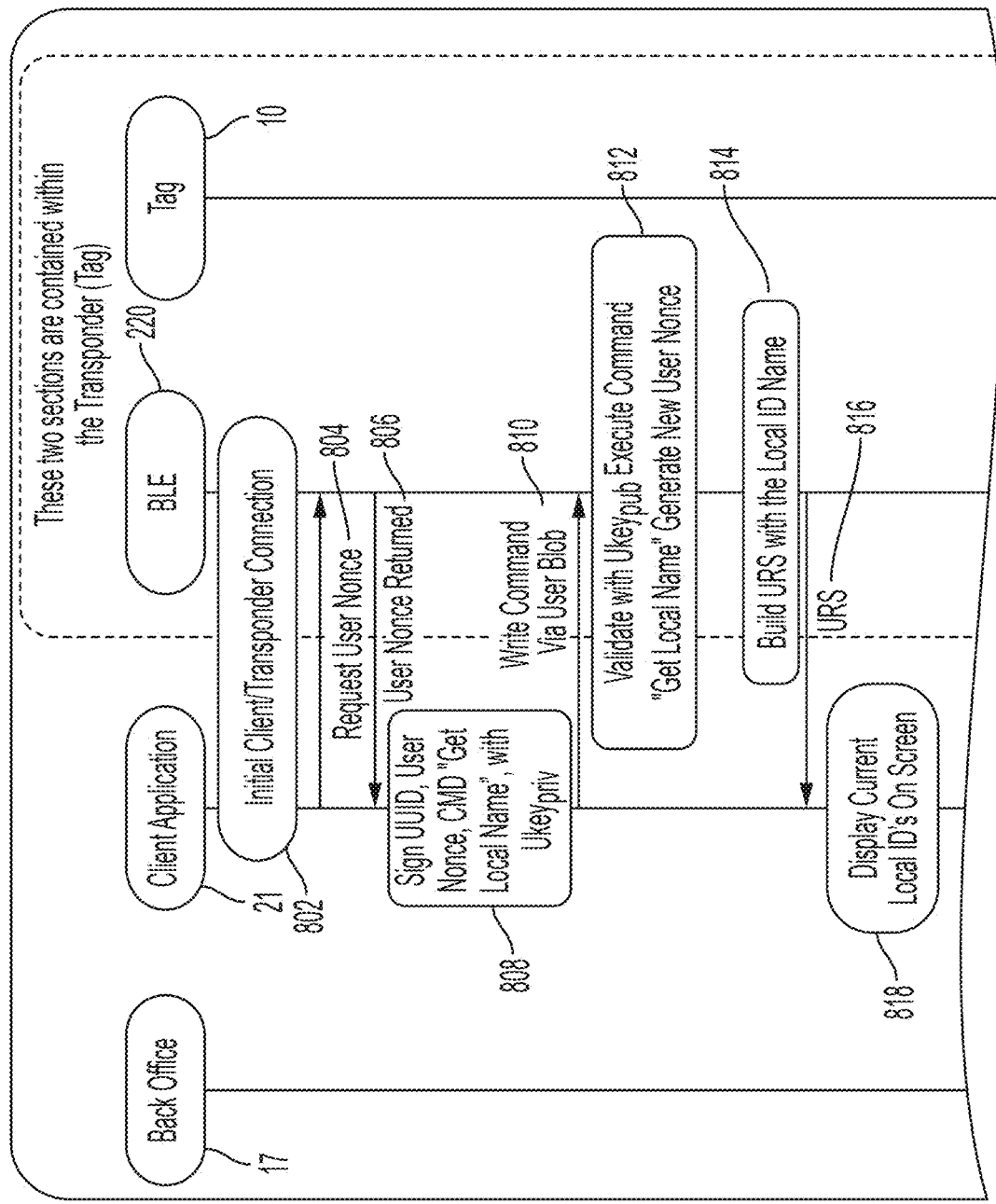
FIGS. 8A and 8B are exemplary signal flow diagrams for identification number assignment to an exemplary BLEET based on user location.
Figure 8B:
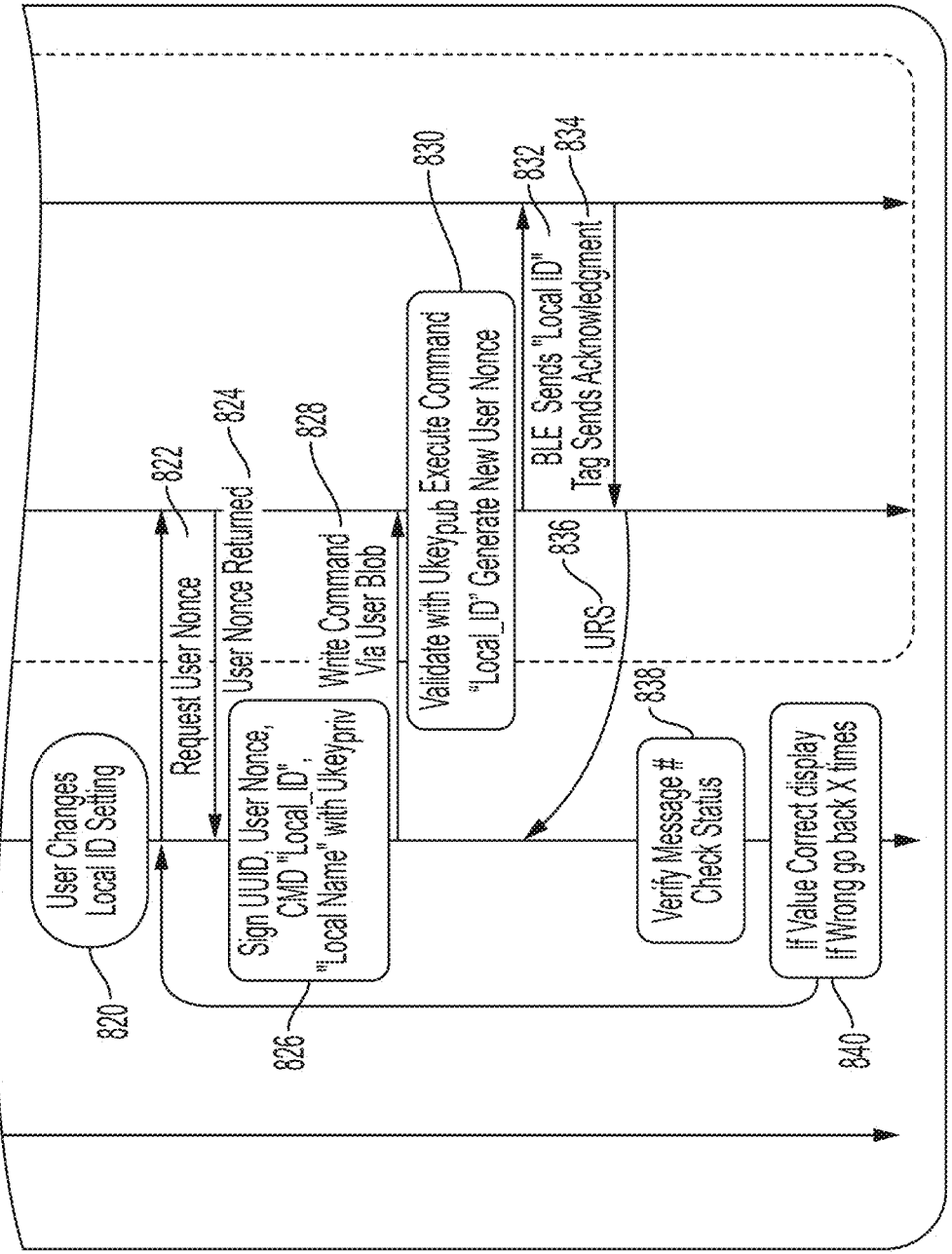

FIGS. 8A and 8B are a use case diagram for identification number assignment to an exemplary BLEET 10 based on user location. Consistent with embodiments described herein, a BLEET 10 may allow dynamic assignment of tag ID numbers based on the location of the tag. Some toll agencies have roaming agreements with neighboring tolling agencies that allow users to use their toll tags in the neighboring agency's jurisdiction, and allow funds to be deducted from their home account. However, some agencies with such roaming agreements also offer toll discounts to their home customers. In order to save money, especially among commercial drivers that incur very large toll bills, people will sometimes open multiple toll accounts and use multiple transponders so that they receive the home agency discount everywhere possible. In one implementation, the BLEET 10 may use the location detection services of a smart phone 20 to detect location of the vehicle. When the phone is within the range of a paired tag, and the phone detects it is approaching another toll agency's territory for which the user has an account, the phone will issue a command to the tag 10 via BLE to switch to the tag ID of the approaching toll agency so that its home agency discount can be utilized.

As shown in FIGS. 8A and 8B, the four entities involved in the use case are the back office 17, the smart phone client application 21, the BLE logic in the tag 220 and the tag itself 10, which represents the electronics including the transceivers for the various protocols described herein. At block 802, the client application 21 initiates an initial client/transponder connection. An exemplary such initial connection is described in FIG. 3C. At 804, the client application 21 requests a under nonce. At 806, the BLE logic 220 transmits a user nonce. At block 808, the client application 21 signs the user nonce and generates a command to "get local name" with the UKey$_{priv}$/UUID. At 810, the client application 21 transmits the command "get local name" as constructed in block 808 via a User BLOB. At block 812, the BLE logic 220 validates the command with the UKey$_{pub}$. If the command is validated, then the BLE logic 220 generates a new user nonce and executes the command by retrieving the local ID name from the BLE memory (e.g., memory 220A). At 816, the BLE logic 220 transmits a URS containing the incoming data message. At block 818, the client application 21 displays the current local IDs on the mobile phone screen. At block 820, the user may change the local ID setting, for example to that of a different state or tolling authority. At 822, the client application 21 requests a new user nonce. At 824, the BLE logic 220 returns a new user nonce. At block 826, the client application 21 constructs a new command by signing the UUID, the user nonce and the command "local ID, local name" with the UKey$_{priv}$. At 828, the client application 21 transmits the command constructed in block 826 via a User BLOB. At block 830, the BLE logic 220 validates the "local ID, local name" command with the UKey$_{pub}$. Assuming that the validation is correct, the BLE logic 220 generates a new user nonce and executes the "local ID, local name" command by sending at 832 a Local ID to the tag logic 10. At 834, the tag logic 10 acknowledges the change of local ID to the BLE logic 220. At 836, the BLE logic 220 sends a URS confirming the change of local ID to the client application. At block 838, the client application 220 verifies the URS message number and checks status of the message. If the returned message in block 838 is correct, then the client application 21 displays the new local ID to the user in block 840. If the returned message in block 838 is not correct, then the client application 21 repeats the sequence begging at k 822 for a predetermined number of times before indicating to the user that the change of local ID has failed.

Figure 8C:
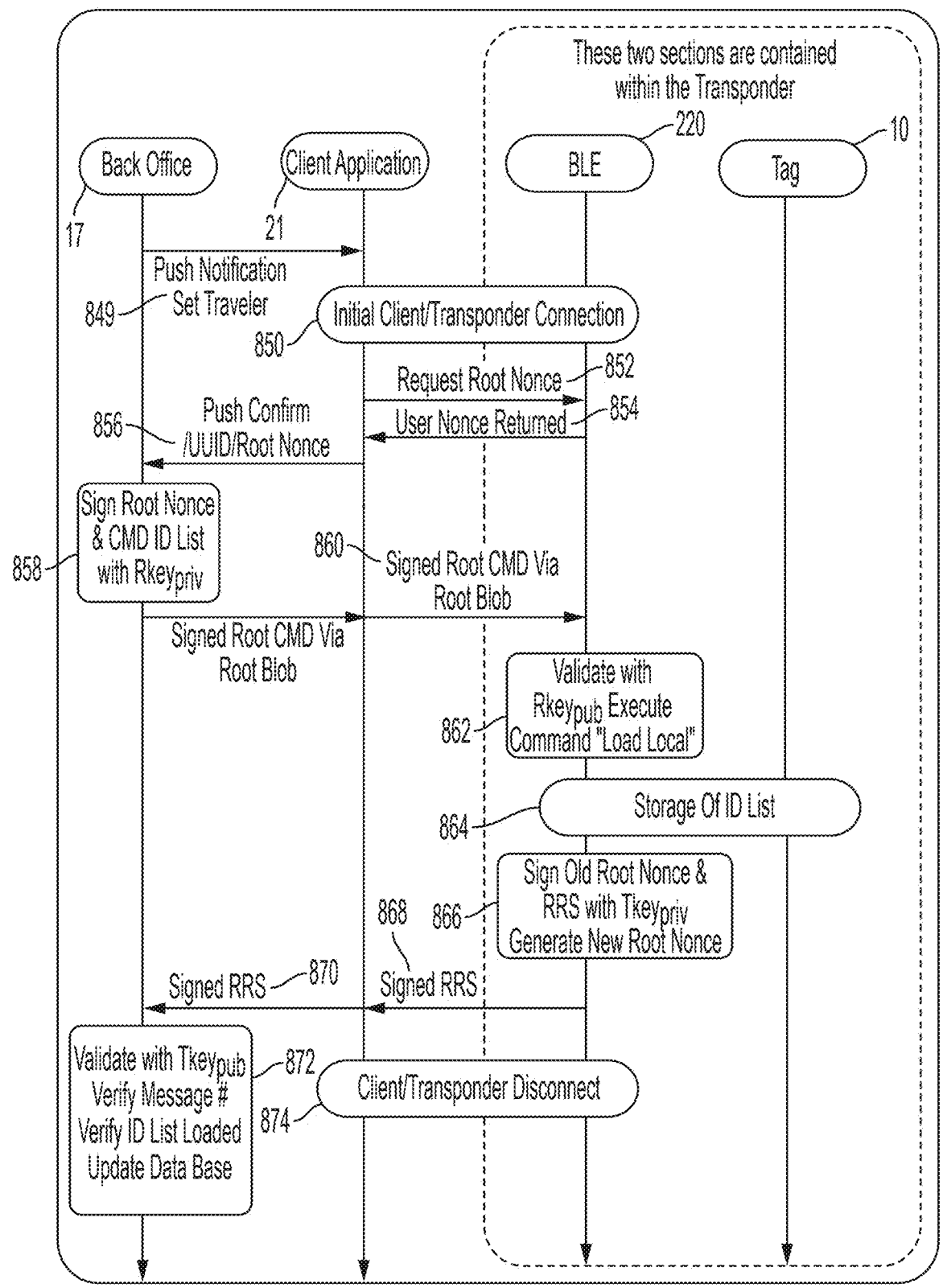
FIG. 8C is an exemplary signal flow diagram for a back office push to a mobile phone of identification data for an exemplary BLEET.

FIG. 8C is a use case diagram for a back office push to a mobile phone of identification data for an exemplary BLEET in traveler mode. The four entities involved in the use case are the back office 17, the smart phone client application 21, the BLE logic in the tag 220 and the tag itself 10, which represents the tool transaction electronics including the transceivers for the various protocols described herein. At 849, the back office sends a push notification to the client application via the cellular network of the new notification to set a traveler ID. At block 850 the client application initiates a connection with the BLEET's BLE logic. At 852 the client application requests a Root Nonce from the BLE logic. At 854 the BLE logic returns a Root Nonce to the client application. At 856 the client application sends a message to the back office comprising the user's UUID and the Root Nonce. At block 858 the back office signs the Root Nonce, the command "ID list" $RKey_{priv}$ to create a Root BLOB. At 860 the back office sends to the client application via the cellular network the signed Root BLOB constructed in block 858. The client application forwards this to the BLE logic. At block 862 the BLE logic validates the signed Root BLOB with the $RKey_{pub}$ and executes the command "load local." At block 864 the BLE logic, assuming success of the validation, loads an ID list into the transponder memory (FIG. 1, 224a). At block 866 the BLE logic signs the Root Nonce and an acknowledge message with the $TKey_{priv}$ and generates a new root nonce. At 868 the signed message is returned to the client application as an RSS, which the client application then forwards to the back office at 870. At block 872, the back office validates the RSS with the $TKey_{pub}$, verifies the activated status of the ID list loaded and updates a transponder ID database. At block 874 the client application and BLE logic disconnect, ending the HOT/HOV ID push process.

Figure 9A:
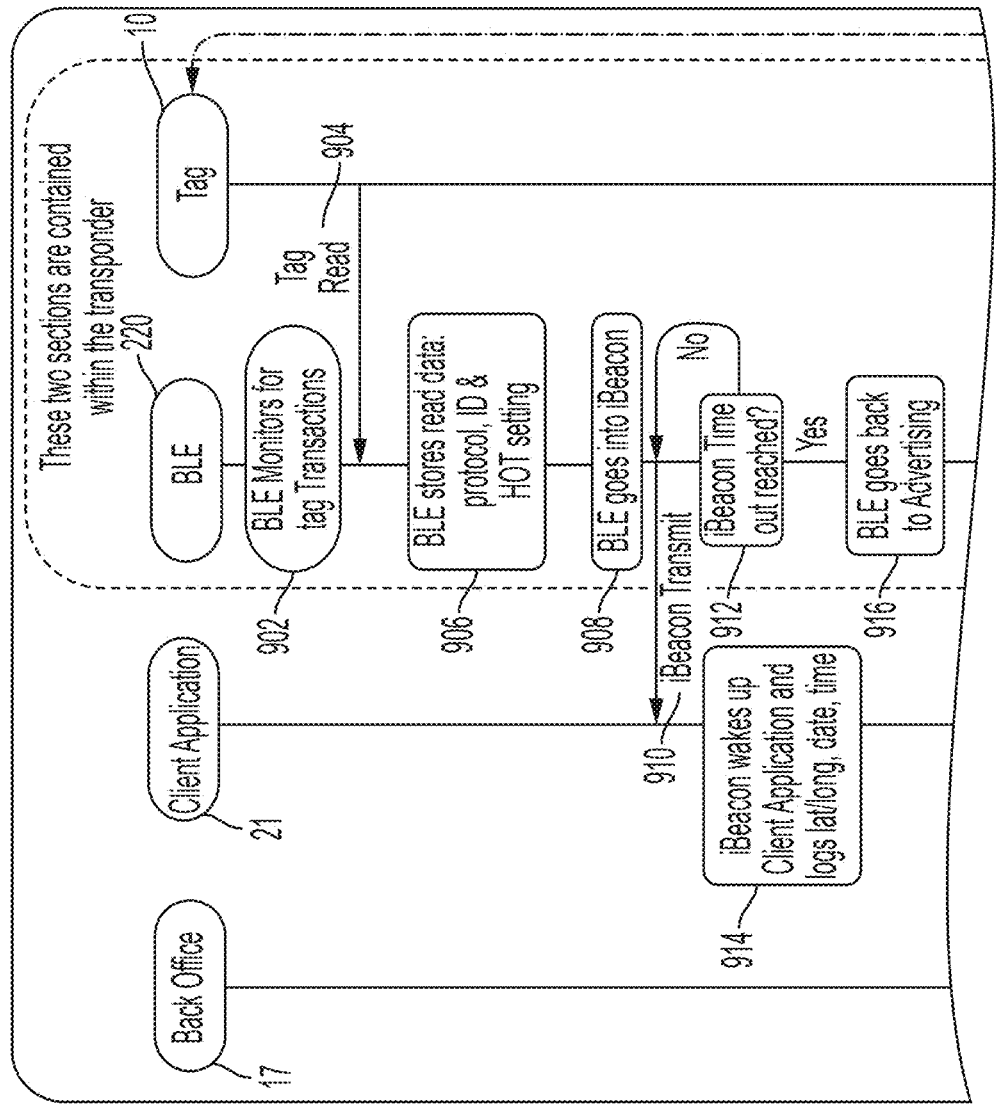
FIGS. 9A and 9B are exemplary signal flow diagrams for logging by a mobile phone of time and location of a read of an exemplary BLEET.
Figure 9B:
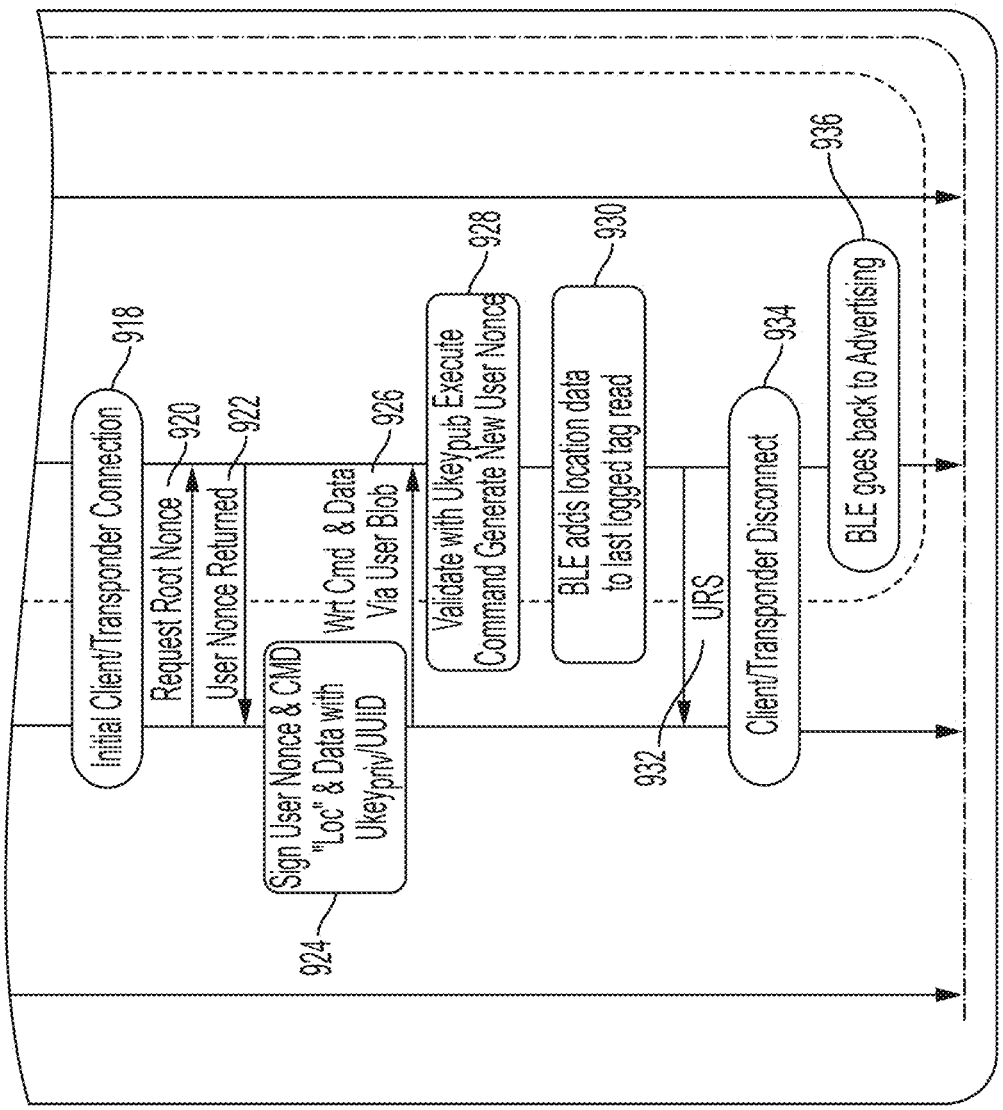

FIGS. 9A and 9B are a use case diagram for logging by a mobile phone of time and location of a read by roadside equipment of an exemplary BLEET 10. Consistent with embodiments described herein, an exemplary BLEET 10 may notify a user smart phone client application 21 via a beacon (e.g., an Ibeacon or another beacon) that a toll transaction has taken place. The smart phone 20 may then access its location facilities (GPS or otherwise) and record the time and location of the read of the transponder. The time and location may then be stored by the client application 21 together with any information from the transponder logic regarding the transaction and later uploaded to a back office as a means for verifying the transponder roadside transaction.

With reference to FIGS. 9A and 9B, the four entities involved in the use case are the back office 17, the smart phone client application 21, the BLE logic in the tag 220 and the tag itself 10, which represents the electronics including the transceivers for the various protocols described herein. At block 902 the BLE logic 220 monitors the transponder 10 logic for any transponder transactions with roadside equipment. At 904, a transponder read occurs and the transponder 10 logic signals the BLE logic 220 that a tag read has occurred and provides to the BLE logic 220 with the read data including protocol, ID, and any HOT/HOV settings. At block 906, the BLE logic 220 records the data from the tag transaction. At block 908, the BLE logic 220 enters IBeacon mode to signal the client application 21. At 910, the BLE logic transmits an IBeacon. At block 914, the client application 21 is awakened by the IBeacon and logs the current location of the smart phone 20, date and time. At block 912, the BLE logic 220 checks an IBeacon timeout limit and of the timeout limit is reached, the BLE logic 220 returns to advertising mode. At block 918, in response to the reception of the IBeacon, the client application 220 initiates an initial client application/BLE logic connection. At 920, a user nonce request is sent by the client application 21. At 922, the BLE logic 220 returns a user nonce. At block 924, the user nonce together with a command "loc" and the location and time stamp data are signed with the $UKey_{priv/UUID}$. At 926, the signed command and data constructed in block 924 is sent by the client application 21 to the BLE logic 220 via a User BLOB. At block 928, the BLE logic 220 validates the command and data with the $UKey_{pub}$ and if the validation is correct, a new user nonce is generated by the BLE logic 220 and at block 930, the BLE logic 220 adds the location and time stamp data to the last logged transponder transaction in the BLE logic memory (e.g., memory 220A). At 932, the BLE logic 220 transmits to the client application 21 a URS acknowledging the command to add location and time stamp data. At block 934, the client application 21 and the BLE logic 220 disconnect. At block 936, the BLE logic 220 resumes advertising mode.

Figure 9C:
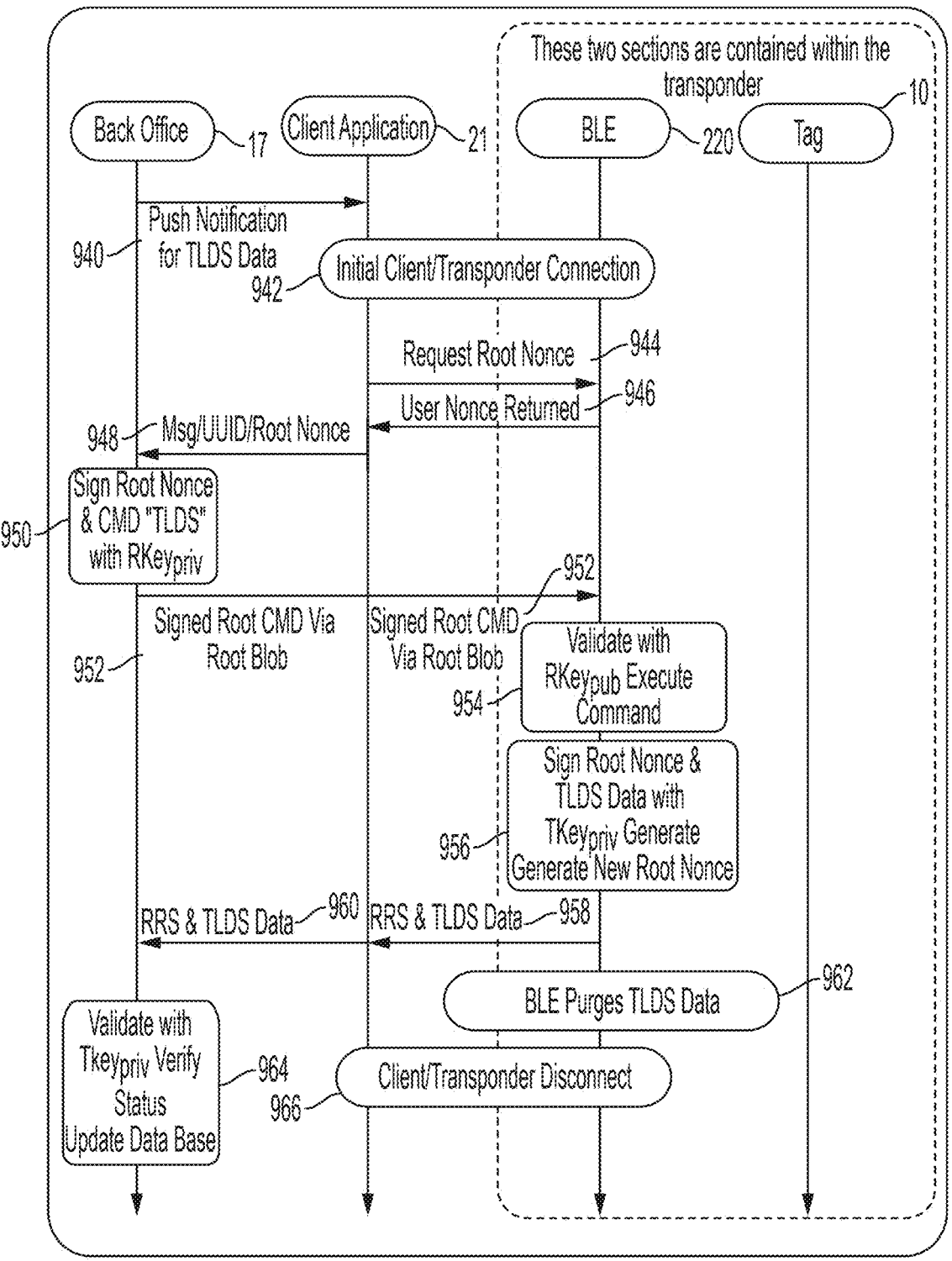
FIG. 9C is an exemplary signal flow diagram for a back office push of the logged data of the use case of FIGS. 9A and 9B.

FIG. 9C is a use case diagram for a back office push of the logged data of the use case of FIGS. 9A and 9B. The back office push is an exemplary way for the back office 17 to securely acquire the time stamp and location data using public/private key security and this allows the back office to initiate the data transaction. At 940, the back office 17 transmits via a cellular network or the internet a push to the client application 21 requesting the time stamp and location data for the recent roadside transponder transaction. This notification may be in response to the back office receiving transponder transaction data via the roadside equipment that interrogated the transponder or may be a periodic request for logged transponder transactions. In response to the push notification from the back office 17, at block 942, the client application 21 initiates an initial client application/BLE logic transponder connection. FIG. 3C is an exemplary procedure for this initial connection. At 944, the client application 21 requests a root nonce (see definitions herein) from the BLE logic. At 946 the BLE logic 220 returns a root nonce. At 948, the client application 21 sends to the back office 17 via the cellular network or the internet a message containing the root nonce and the UUID of the transponder. At block 950, the back office 17 signs the root nonce and the command "TLDS" with the $RKey_{priv}$. (See definitions above.) The command "TLDS" instructs the client application 21 to return time/location/date/stamp (TLDS) data to the back office 17. At 952, the back office 17 sends the signed command via a Root BLOB to the client application 21 and the client application 21 sends the signed command to the BLE logic 220 via the Root BLOB. At block 954, the BLE logic 220 validates the signed command with the $Rkey_{pub}$. If the command is validated, then at block 956 the BLE logic 220 signs the Root Nonce and the TLDS data with the Tkeypriv/UUID and generates a new root nonce. At 958, the BLE logic 220 transmits the signed message formed in block 956 to the client application 21 via the Bluetooth® LE link. At 960, the client application 21 sends the TLDS data to the back office 17 via a cellular network connection or the internet. At block 964, the back office 17 validates the TLDS message with the $Tkey_{priv}$ and if valid, the back office 17 updates its transaction database with the TLDS data for the roadside transaction. At block 962 the BLE logic purges the TLDS data. At block 966 the client application 21 and the BLE logic 220

Consistent with embodiments described herein, a BLEET 10 may enable portability of tag ID based on the driver of the vehicle. Instances arise where a user has a tolling account, but drives a car that does not belong to him/her (such as a rental car, or borrowing someone else's car) and the person wishes to use his/her own tolling account with the borrowed vehicle and a BLEET that is in the borrowed vehicle. In this case, a smart phone application retains credentials of the user's tolling account irrespective of which transponder they are used with. When a user enters a vehicle with a BLEET that is associated with the vehicle, the phone 20 can pair with the tag, and issue a command to the tag to use the new driver's tag ID while their phone is within range of the vehicle. Once the user leaves the vehicle, the tag can revert its ID number back to the original owner's tolling account. When a phone is unpaired from the phone, another phone can be paired with the BLEET. This process may be useful in a rental car situation.

Figure 10A:
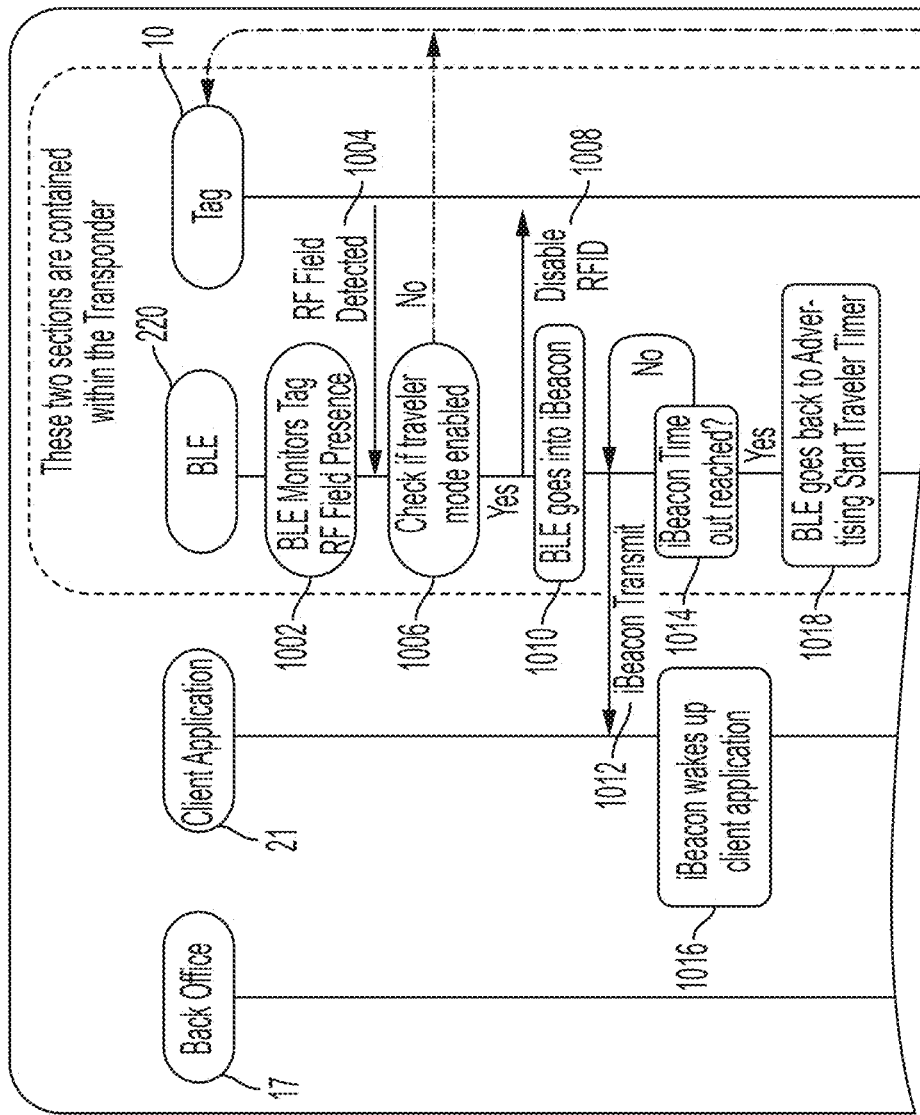
FIGS. 10A and 10B are exemplary signal flow diagrams for arming of an exemplary BLEET by a smart phone in a rental car situation.
Figure 10B:
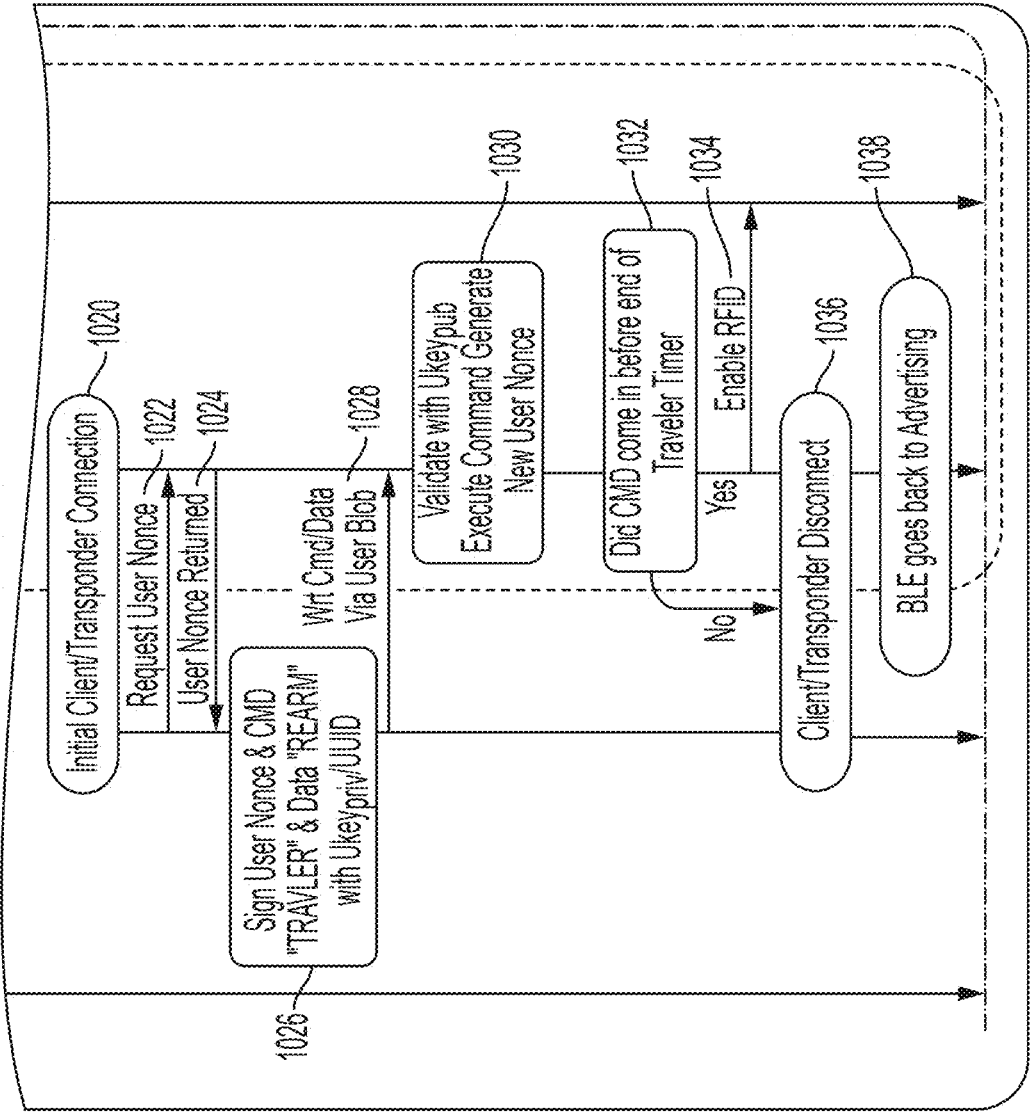

Use case diagrams illustrated in FIGS. 10A and 10B describe an exemplary process for arming a BLEET in a "traveler" mode. This mode may allow a BLEET to be used by anyone entering the vehicle associated with the BLEET as long as the user has a smart phone connected to a user account and that has a client application capable of connecting to the BLEET over Bluetooth®. When no user is in the vehicle with a smart phone, the BLEET reverts to "traveler" mode wherein it does not respond to RFID interrogations by roadside tolling equipment. When a user that as linked a client application to the BLEET leaves the range of Bluetooth communication with the BLEET, the client application may cause the user's mobile phone to issue an audible, vibratory or other form of alert to inform the user that the connection is severed and that the BLEET is now disabled for further tolls. Likewise, the BLEET may issue an audible alert when the Bluetooth® connection with the most recent user is terminated. Traveler mode may be set by a data bit in the BLE logic section 220. BLEET disablement may also be used in any mode of operation, not just traveler mode when a user leaves the vehicle and the Bluetooth® connection is severed. This prevents hackers from attempting to access transponders and steal user information or transponder identification, for example, in a parking lot.

At block 1002, the BLE logic section 220 of a BLEET monitors the tag's transponder logic 10 for a detected RF field by a tolling or other roadside RFID interrogation equipment. At 1004, the tag 10 detects an RF field. At block 1006, the BLE logic 220 checks if traveler mode is enabled, i.e., that there is presently no user account associated with the tag and no mobile phone with a BLEET client application in range of the tag. If the tag is not in traveler mode, then the tag 10 responds to the interrogation and the tag's BLE logic 220 maintains normal advertising mode. If the tag is in traveler mode, this means that the tag presently is not connected to a user account and at 1008, the RFID section of the tag 10 is disabled by the BLE logic 220. At block 1010, the tag's BLE logic 220 enters IBeacon broadcast mode for a limited period of time as shown by block 1014. Prior to IBeacon time out, the BLE logic 220 periodically transmits an Ibeacon or other beacon at 1012. If a smart phone client application 21 does not respond to the IBeacon within the timeout period, then at block 1018, the BLE logic 220 resumes advertising mode. If a client application is "awakened" by the IBeacon at 1016, then at block 1020 (FIG. 10B), the client application 21 initiates an initial client transponder connection. At 1022, the client application 21 requests a user nonce. At 1024, the BLE logic 220 returns a user nonce. At block 1026, the client application 21 signs the user nonce, a command "traveler" and data "rearm" with the $UKey_{priv}$. At 1028, the client application 21 transmits the message constructed in block 1026 via a user BLOB. At block 1030, the BLE logic 220 validates the BLOB with the $UKey_{pub}$ and generates a new user nonce. At block 1032, the BLE logic 220 checks that the return of the message from the client application 21 came before the end of a traveler timeout started in block 1018. If the answer is yes to block 1032, then at 1034, the BLE logic 220 enables the RFID electronics in the tag 10. If the answer is no, then the RFID is not enabled. In each case, at block 1036, the client application 21 and the BLE logic 220 disconnect. At block 1038, the BLE logic 220 resumes advertising mode.

Figure 10C:
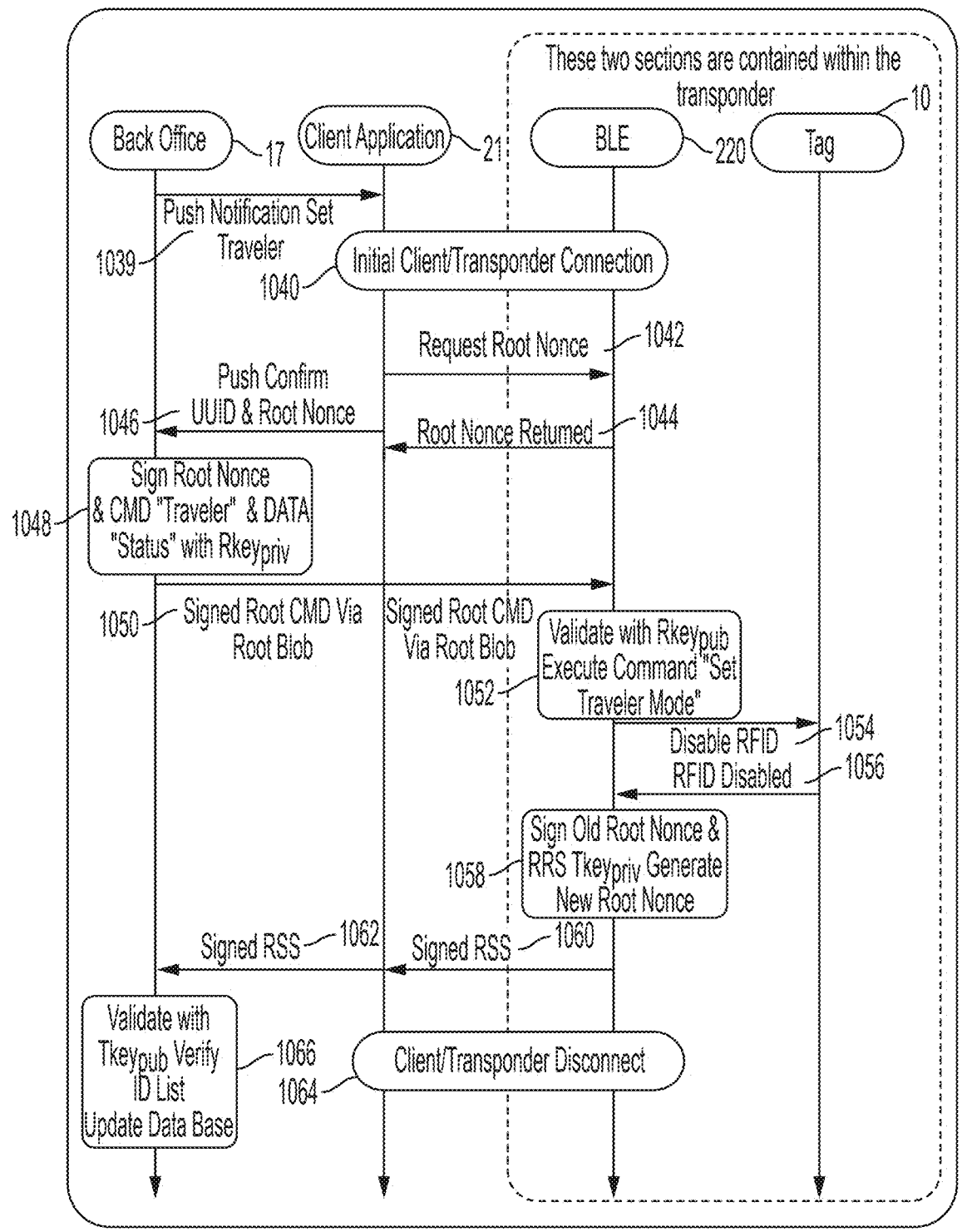
FIG. 10C is an exemplary signal flow diagram for a back office push for the arming transaction described by FIGS. 10A and 10C.

FIG. 10C is a use case diagram for a back office 17 push for the arming transaction described by FIG. 10A. The back office 17 push use case covers the setting of the traveler mode in the transponder from the back office. At block 1039, the back office 17 pushes a notification to the client application 21 to set traveler mode. At block 1040, the client application 21 initiates a connection with the BLE logic 220. At 1042, the client application 21 requests a root nonce. At 1044, the BLE logic 220 returns a root nonce. At 1046, the client application 21 pushes the root nonce to the back office 17 and the back office 17 confirms the root nonce. At block 1048, the back office 17 signs the root nonce, a command "traveler" and data "status" with the $RKey_{priv}$. At k 1050, the back office 17 pushes the signed message constructed in block 1048 to the client application 21 via a root BLOB, which then transmits the root BLOB to the BLE logic 220. At block 1052, the BLE logic 220 validates the BLOB with the $RKey_{pub}$ and executes the command "set traveler mode". At 1054, the BLE logic 220 instructs the tag RFID electronics to disable the RFID. At 1056, the tag electronics confirms the disablement of the RFID electronics. At block 1058, the BLE logic 220 signs the old root nonce with the TKeypriv and generates a new root nonce. At 1060, the BLE logic 220 transmits this signed message via an RSS to the client application 21, which at 1062 transmits this to the back office via the cellular network. At block 1066, the back office 17 validates the RSS with the TKeypub, verifies the ID list for the tag and updates its tag database. At block 1064, the client application 21 and the BLE logic 220

Consistent with embodiments described herein, a BLEET enables the ability to support field upgrades of tag firmware. If toll agencies have the need to modify their protocol or the way tags work in the field, users can be instructed to download a phone application that will pair with the tag and upload new firmware for the BLE equipped multiprotocol tag.

Consistent with embodiments described herein an exemplary BLEET enables the ability to conduct automatic instant toll payment. Current toll systems require tolling agencies to maintain accounts for all users, and have whitelists of active transponders regularly updated at all tolling locations. When a transponder tied to an active account is read at a tolling point, the tolling agency then deducts funds from the user's prepaid account. In a tolling system using BLEETs, the tag may be configured to remain disabled until a valid and current account with a Toll Operations Services Entity (TOSE) is verified. The tag ID assigned to the transponder can be encrypted with overlapping domain and range functions so that the validity of the tag itself is authenticated when the BLEET is read at a tolling point. The BLEET then sends a message to the user's smart phone via BLE that a tolling event has occurred. The user's smart phone then initiates the financial transaction over the cellular network based upon the toll location.

Since the user's phone proactively initiates payment from a single escrow account that the user set up with the Toll Operations Services Entity (TOSE), this eliminates the burden of the toll agencies maintaining updated tag whitelists at all tolling points. In addition, funds from the single escrow account can be sent directly by the TOSE to the correct toll agencies from the user's escrow account, thus eliminating the need for inter-agency settlement or clearinghouse functions which can be expensive, complicated and difficult to maintain. If a vehicle drives through a tolling point, and a phone based transaction is not triggered, either the person does not have a phone-based tolling account set up, or their phone was off. Either of these cases initiates the agency's rules for handling toll violations. In an embodiment, an RFID reader at a toll plaza (see FIG. 1. Ref 16) communicates via RF 18 with a BLEET 10. The BLEET 10 then communicates via BLE 14 to a smart phone 20. The phone 20 links via cellular network 24 to the cellular carrier's towers 22 which then connect to a toll authority's back end processing system (not shown).

Consistent with embodiments described herein, a BLEET may be used to streamline the financial process of toll collection. The financial process flow of payments involves a driver, a tolling equipment and services provider (such as TOSE), and each toll agency. Currently, drivers that drive across toll roads in the United States do not have prompt financial feedback regarding the toll fees they incur. The driver is responsible for all toll charges accrued across the toll roads they travel on, the funds, however, will be processed and paid to the respective toll agency by TOSE. Since TOSE is reconciling, calculating, and reporting the toll charges accrued by each transponder account holder or driver, TOSE will be responsible for compensating each agency directly on behalf of each driver With a BLEET, an exemplary financial process may initiate with the setup of an escrow account where the potential driver or BLEET holder authorizes a deposit into a third party-controlled account. This account set-up may be done by TOSE after the driver or account holder registers with TOSE. This account may hold funds necessary for TOSE to make payments to each toll agency that the driver accrues. The driver will setup an account with TOSE and at that time authorize TOSE to charge a credit card or debit to a checking account provided. The funds go into the escrow account and TOSE will use the funds in the escrow account to compensate the toll agencies for accrued charges on the behalf of the driver. An initial deposit will be required by the account holder to serve as a backstop for TOSE to ensure there is always a positive balance to make payments on behalf of the driver. One advantage TOSE will possess is the ability to calculate and report toll charges in a more real-time scenario than that of each toll agency. As a result, TOSE will process frequent charges in the authorized approach, elected by the driver at time of account setup. In most cases these charges will be processed immediately as the toll charges are recorded between the transponder and reader within the toll lane.

Consistent with embodiments described herein, a BLEET enables messaging to the tag owner (via the smart phone client application) of the toll charges and status of the driver's account. The escrow account balance, after accrued toll charges are transferred to TOSE, will remain with the third-party bank. Only the respective toll charges and other applicable fees accrued will transfer to TOSE's bank account and financials from the escrow account. After the transfer from the escrow account to TOSE, the toll charges accrued by the driver will immediately be recorded on TOSE's financials as a debit to cash and offsetting credit to a liability that will be paid to the toll agency. TOSE will then later reconcile with the toll agency and pay for the toll charges accrued on behalf of the driver.

The escrow account unused monies, in most cases the initial deposit, will return to the driver or account holder upon cancellation of the contract and services with TOSE described herein. Another potential flow of funds can be applied removing the escrow account. As experience and trust is built between the driver and TOSE, TOSE may elect to remove the escrow account from the process flow of funds and choose to interact directly with the driver for payment of toll charges accrued. In this instance TOSE will process the funds owed directly from the driver's account or method of payment. A deposit may still be required in this instance, which TOSE may hold as a liability on their financials. Like the scenario with the escrow account, the deposit or unused monies paid by the driver will be returned to them upon cancellation of the contract and services with TOSE.

Figure 11:
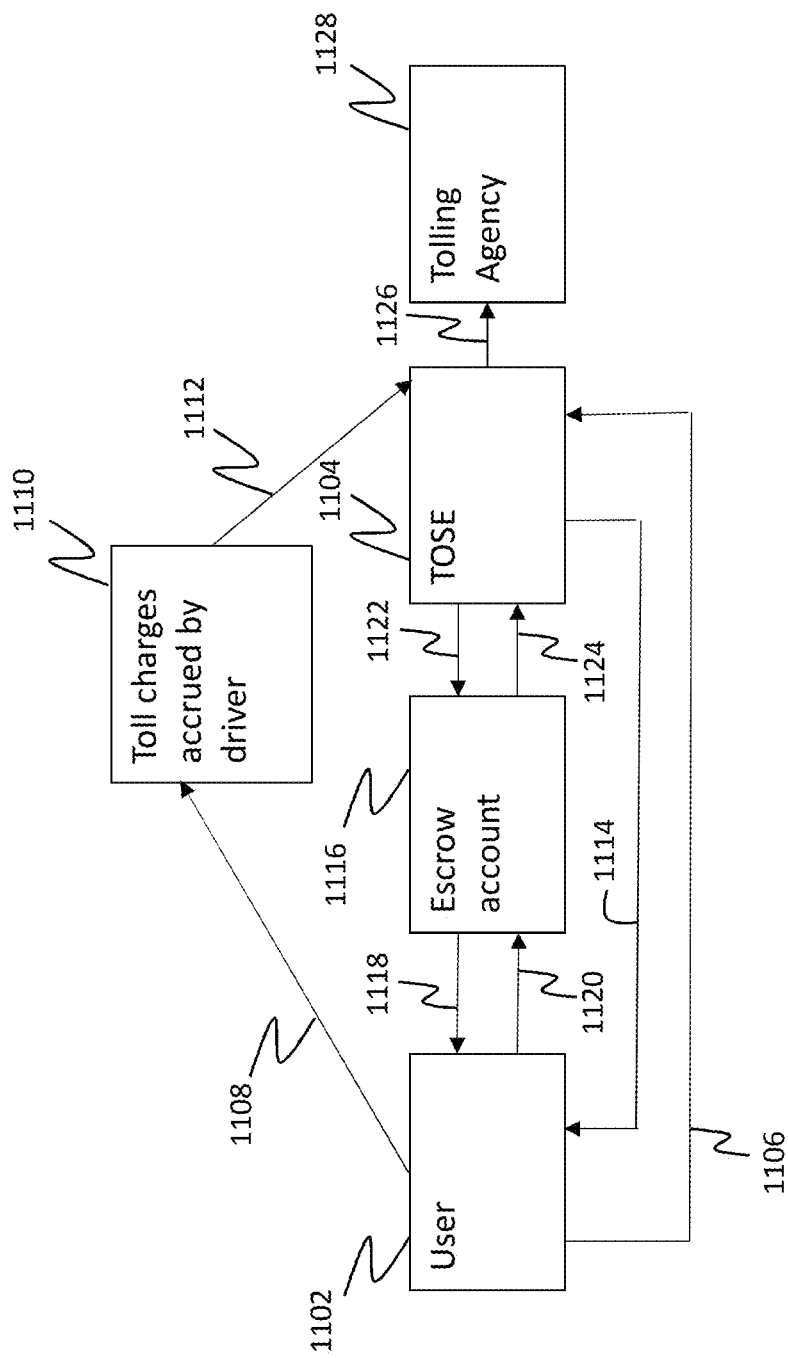
FIG. 11 is an exemplary flow diagram for a financial transaction.

FIG. 11 is a diagram of financial transactions between entities in an exemplary payment process through a TOSE. At user 1102 sets up an account with a TOSE 1104 in transaction 1106. The driver travels 1108 through toll plaza with a BLEET, incurring toll charges 1110. A toll transaction may be recognized by the BLEET at a toll collection zone in at least one of the supported RFID protocols. Then, the BLEET goes into a beacon mode (e.g., iBeacon mode or other beacon mode) to awaken the phone and allow the smart phone application to operate in the OS background. The smart phone client application initiates a GPS fix and compares the location to a table of known toll locations and the associated toll amounts for each vehicle class. This table can be resident and the comparison can occur either by downloading the table to the phone and stored in memory, or the transaction sent over a wide area network (WAN) where the table is resident and the comparison performed. In either instance, the GPS fix is determined to be in the proximity to a toll collection point within a specified tolerance of the toll collection point. The corresponding toll amount is looked up in the table and the TOSE 1104 is notified 1112 of toll charges accrued by the specific driver. The toll charges accrued by the user are determined in part by the state of the BLE tag 10, as described in embodiments herein. TOSE provides prompt notice 1114 to the user via the smart phone client application of toll charges accrued. The user's account with TOSE is properly updated to reflect these charges. The driver's account may be accessed by smart phone using the BLE tag. TOSE 1104 sends notice to third party account holder (escrow bank account) 1116 to charge the user 1102 for toll charges accrued and any other applicable fees. The escrow bank account 1116 processes 1118 charges from driver's elected account or method. The user pays 1120 funds into escrow account 1116. The TOSE 1104 notifies the escrow bank account 1122 and removes 1124 the transaction's funds from escrow account 1116. TOSE 1104 then pays 1126 the specific tolling agency 1128 toll charges for specific transaction.

Consistent with embodiments described herein, a BLEET enables users to geographically correlate a tolling event to a specific toll plaza using the GPS function on the smart phone and store this information on the phone and correlate it to a whitelist contained in the transponder memory that contains current toll rates. This data may be downloaded via the BLEET interface client application or a second client application to a third party such as a rental car company to provide real time invoicing for tolls incurred at time of return of the vehicle. This provides advantages over the current means of billing for tolls that relies on the rental car company waiting on an invoice from the toll authority before closing out the rental account with the rental customer who traversed the tolling station.

In a further embodiment, a BLEET includes a motion sensor (see FIG. 2, element 204). Upon detection of lack of motion, the BLEET may enter a deep sleep state. Prior art transponders try to maintain long battery life by putting a tag into a low current mode, and then waking the tag circuitry upon detection of a specific type of signal. However, with the integrated motion sensor, the tag can be almost completely powered off such that it has even lower sleep current when the motion sensor detects no motion, with the sensor itself drawing very little current, and much less than in the prior art transponders. When the motion sensor senses motion, the motion sensor sends a signal to the remaining circuitry to turn on. This approach ensures that the tag life is greatly extended, since the tag only draws more than a very low current while in the vehicle is in motion. In a typical vehicle used of three hours per day, this power savings may extend the battery life of the tag by, for example, almost a factor of eight over prior art approaches.

In a further embodiment, the BLEET may be used in a system for charging fees to drivers who enter congested traffic areas at high volume time periods. The concept may be termed "congestion pricing" and provides a disincentive in the form of high toll costs to drive in a congested area during certain time periods.

Figure 12:
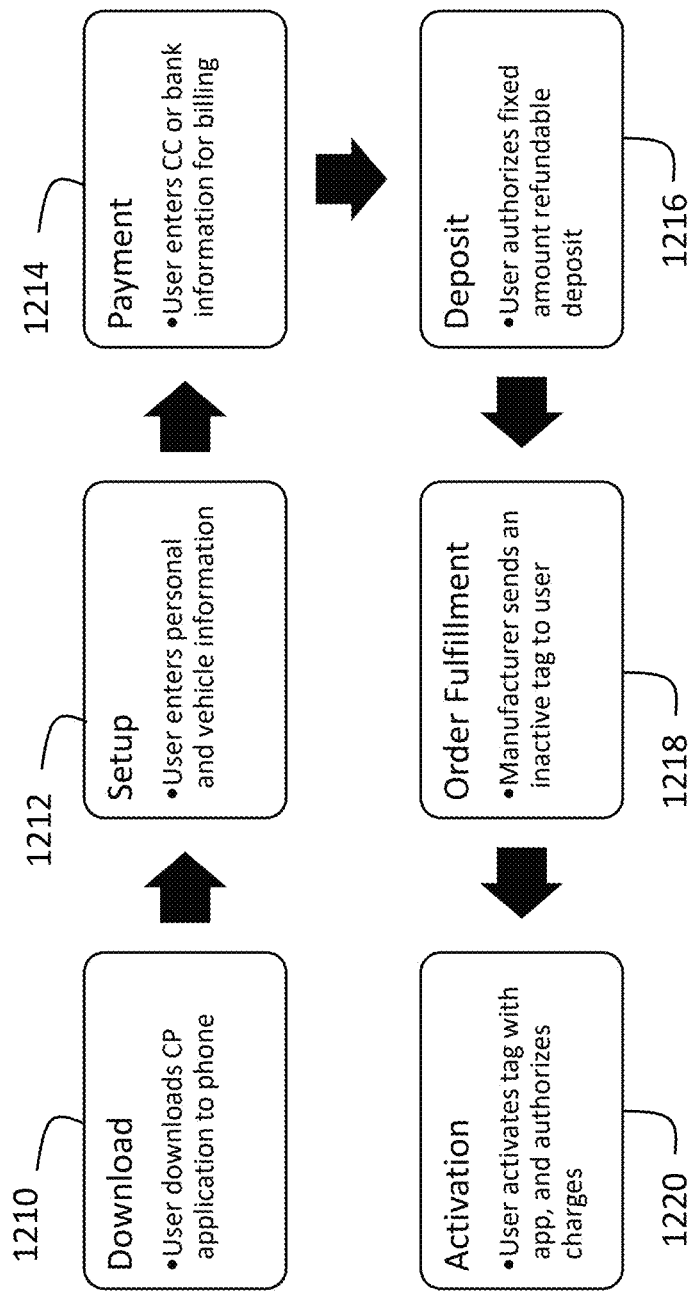
FIG. 12 is an exemplary flow diagram for initialization of a transponder.

FIG. 12 is a flow diagram for an exemplary process for initializing a new BLE transponder by a user. At 1210, the user downloads an application program on a mobile device 20 which may be a smart phone. At 1212, the user enters information via the application program, which may include personal identification information and vehicle information. At 1214, the user enters payment information via the application program, which may be a credit card account or a bank account. At 1216, the user authorizes the tolling agency to be paid a refundable deposit out of the account identified in block 1214. At 1218 the transponder supplier sends an inactive transponder 10 to the user. At 1220, the user activates, via the application program, the transponder 10 for use in a vehicle 12 to automatically pay tolls. In a further embodiment, the user may purchase an inactive transponder 10 at a store or automated vending site and complete the process as described above instead of having it mailed.

Figure 13:
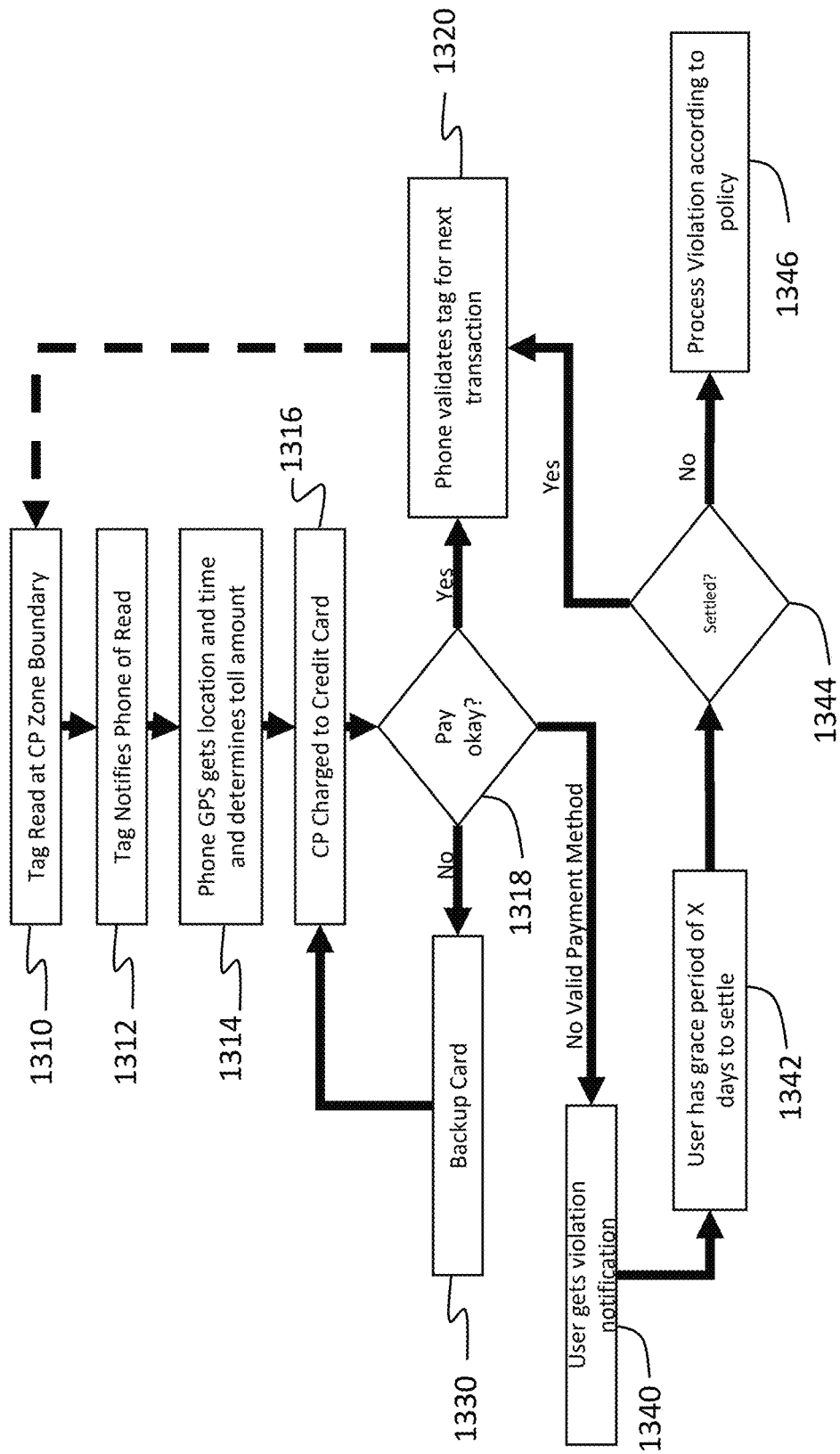
FIG. 13 is an exemplary flow diagram for use of a BLE tag for congestion priced toll collection.

FIG. 13 is a flow diagram for use of a BLE tag to assess and collect congestion pricing (CP) fees. At 1310, roadside RFID reader equipment 16 reads the transponder 10 at a congestion pricing area boundary. At 1312, the transponder 10 notifies the user's smart phone 20 of the read. Notification may be made by a Bluetooth link 14. At 1314, the smart phone 20 accesses its GPS hardware to determine location. Based on location and time, the smart phone 20 determines a toll amount to enter the CP area. The toll amount may be based on the time of day, day of week, location, amount of congestion, etc. At 1316, the smart phone 20 authorizes the toll amount to be charged to a credit card registered to the user. If at 1318 the payment was accepted, then at 1320 the smart phone 20 validates the transponder 10 for a new or next transaction. Validation may be made by a Bluetooth link 14. If the payment was not accepted at 1318, then at 1330 the smart phone 20 may authorize a payment via a backup credit card or account. The backup card will be charged at 1316. If on the second attempt to charge a card no valid payment was made, then at 1340 the smart phone application will notify the user of a violation in entering the CP area without payment. At 1342, the user is granted a grace period to settle the payment deficiency. If the payment is settled (1344—yes), then at 1320, the smart phone 20 validates the transponder 10 for a new or next transaction. If the payment is not settled within the grace period (1344—no), then at 1346, a CP violation will be processed against the user based on government or other policy associated with entering the congested traffic area.

Figure 14:
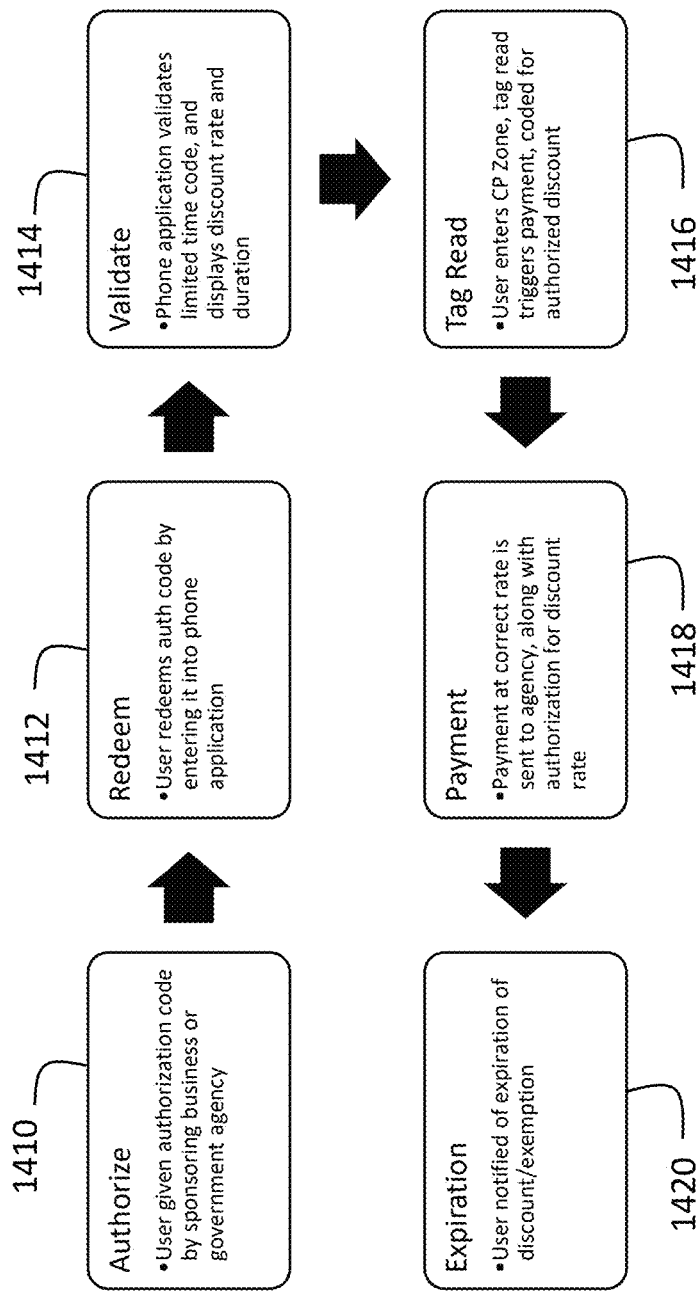
FIG. 14 is an exemplary flow diagram for enabling a temporary discount assigned to a particular BLE tag user.

FIG. 14 is a flow diagram for an exemplary process for authorizing a discounted rate or free passage into a CP area for limited time periods. This may be for uses such as system maintenance operators, emergency services, promotional programs (e.g. special events wherein the price of the event includes entry cost into the CP area.). At 1410 the user is given an authorization code by a sponsoring business or government agency. At 1412, the user redeems the authorization code by entering it into the smart phone 20 tolling application. At 1414, the smart phone application validates the authorization code with a tolling agency and displays the discount rate and discount duration time. At 1416, the user enters a CP zone, the transponder 10 is read (as per FIG. 13) and the discounted payment is triggered on the smart phone 20. At 1418 payment at the correct (nominal rate) is sent to the tolling agency by the smart phone 20 along with the authorization for the discount. At 1420, the discount period ends and the smart phone 20 notifies the user of the expiration of the discount period. The discount may also be limited to a specific number of CP zone entries as opposed to a specific time limit.

In a further embodiment, congestion pricing may be keyed to vehicle occupancy. Entry of vehicle occupancy into a smart phone application and subsequent transmission to a tolling transponder may be as described herein. In a further embodiment vehicle occupancy signaling to the transponder may be automated by each occupant's smart phone communicating with a transponder or with the user's smart phone. Thus occupancy would be based on the number of occupants having smart phones in the vehicle.

In a further embodiment, the roadside RFID reader 16 transmits a time/date/location (TDL) message to the RFID transponder 10. The RFID transponder 10 may transmit the TDL message or information derived from the message to the smart phone 20. The smart phone 20 may then include with the aforementioned GPS derived location the TDL information from one or more RFID reader interactions with the RFID transponder to create a toll amount. Using this more comprehensive set of location data may be desirable in an area where GPS signals are weak, and also as means of tracking the vehicle's path. This may desirable where congestion pricing borders are close to roadways outside of the congestion pricing zone or where the fee charged is waived for minimal entry into the zone. In a further embodiment, the RFID transponder 10 stores the TDL messages for later upload to the smart phone 20 in a single communication.

Figure 15:
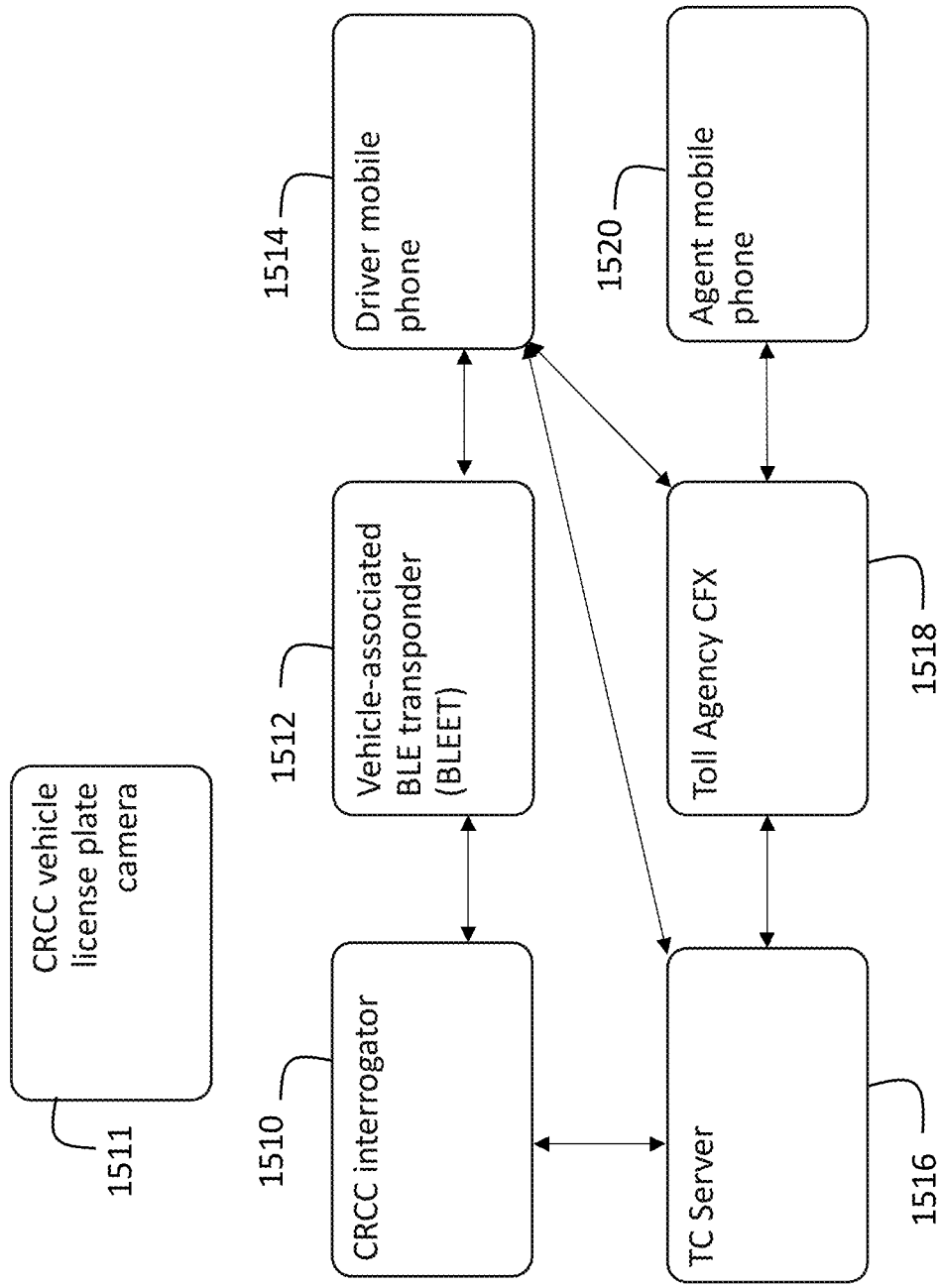
FIG. 15 is an exemplary system diagram for a rental car having a BLE tag.

In a further embodiment, The BLEET tag can be used to correlate the current user of a tag which may be shared among multiple users such as in the case where a tag is installed in a rental vehicle. Consistent with an aspect of the invention, FIG. 15 shows an exemplary system comprising a commercial rental car center (CCRC) tag interrogator 1510, a CRCC camera 1511, a BLEET 1512 associated with rental vehicle, a driver smart mobile phone 1514, a transaction center (TC) server 1516, a toll agency server 1518 and a rental agent smart mobile phone 1520.

Figure 16A:
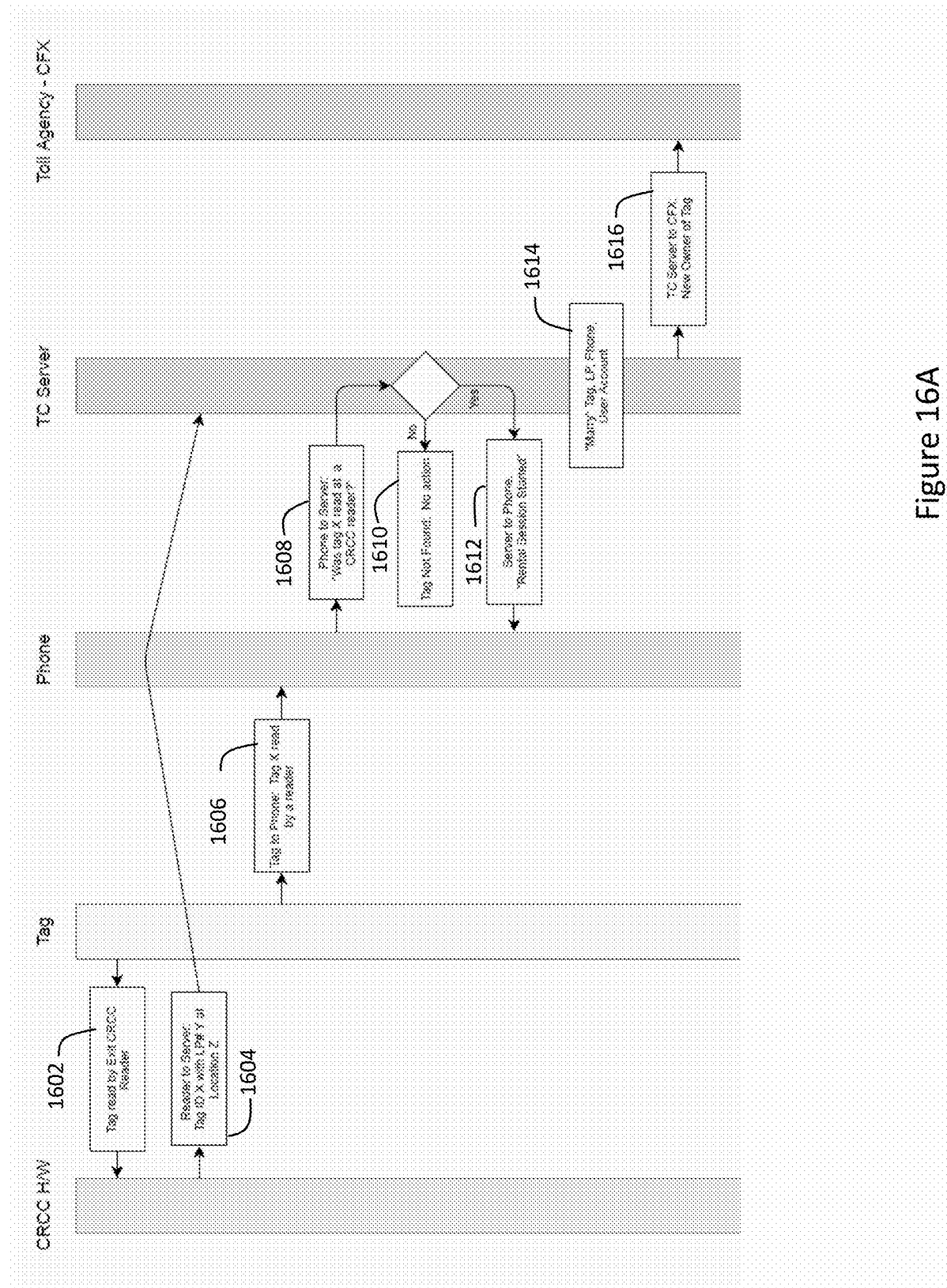
FIG. 16A is an exemplary transaction flow diagram for a rental car having a BLE tag.
Figure 16B:
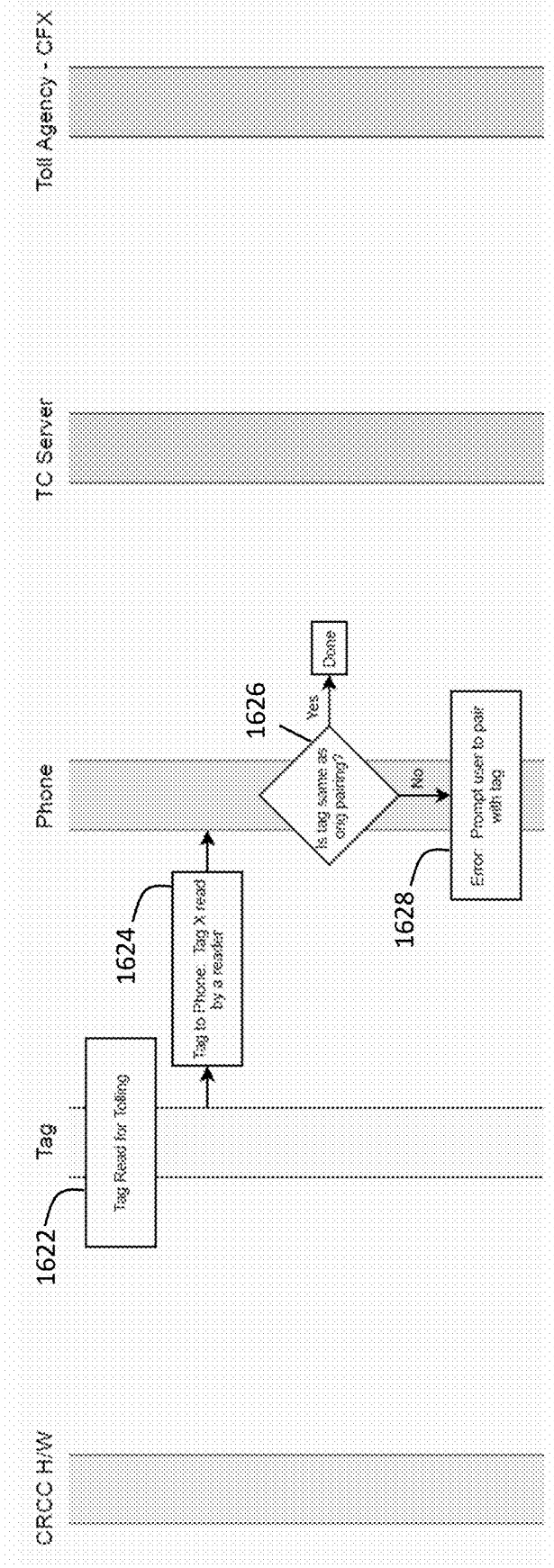
FIG. 16B is a further exemplary transaction flow diagram for a rental car having a BLE tag.

Consistent with an aspect of the invention, and as shown in FIG. 16A, when a rental vehicle containing a BLEET 1512 approaches an interrogator (reader) 1510 at a commercial rental car center's (CRCC) exit gate, the CRCC reader 1510 will read the tag, 1512 and a camera 1511 linked with the CRCC reader will also read the license plate of the rental vehicle the moment the tag was read. Those two data points will be linked by the CRCC reader 1510 or a separate CRCC server (not shown) to indicate which tag is in which rental vehicle. This information will then be sent to a database server, such as TC server 1516. Additionally, as shown in FIG. 16B, when the BLEET 1512 is read by the CRCC reader 1510, the BLEET will send a message to the user's phone 1514 via RF signal indicating that the tag was read. The user's phone 1514 will then use its cellular backhaul to connect to the database server 1516 and determine if the tag 1512 was read by a reader 1510 at a rental car facility. If the tag 1512 was read at a rental car facility, the database server 1518 will link the user's phone/account, vehicle license plate, RFID tag together as a single unit for tolling, and begin a new tolling session.

The exemplary process of FIG. 16A is as follows: at step 1602 the BLEET is read by the CRCC reader on exit from the rental facility. At step 1604 the CRCC reader sends relevant information about the read to the transaction center server 1516. At step 1606 the BLEET sends a message to the user's smart phone 1514 to inquirer whether the transaction was made at a rental center. If no, then step 1610 indicates that no action is taken. If yes, then at step 1612 the TC server messages the phone that a rental session has started for that BLEET and vehicle. At step 1614, the TC server links ("marries") the BLEET, the vehicle license plate, the user phone and a user account. At step 1616, the TC server 1516 notifies the back office server 1518 that the owner of the phone is the current "owner" of the BLEET so that all toll transactions occurring on that BLEET will be assigned to the mobile phone owner until the tag is de-linked from the phone/owner upon re-entry to the rental center.

FIG. 16B shows an exemplary process for reading of the rental vehicle BLEET by tolling equipment. At step 1622 the BLEET 1512 is read by a highway reader. At step 1624 the BLEET 1512 indicates to the user's smart phone 1514 that a toll transaction has occurred for the BLEET associated with phone. At decision point 1626, the phone app determines whether the tag just read is the same as the one paired at the rental center. If yes, then the read is simply confirmed by the phone app. If no, then at step 1628 the phone prompts the user that the tag needs to be paired to an account associated with the user or that the user needs to send an error message to the tolling agency.

Figure 16C:
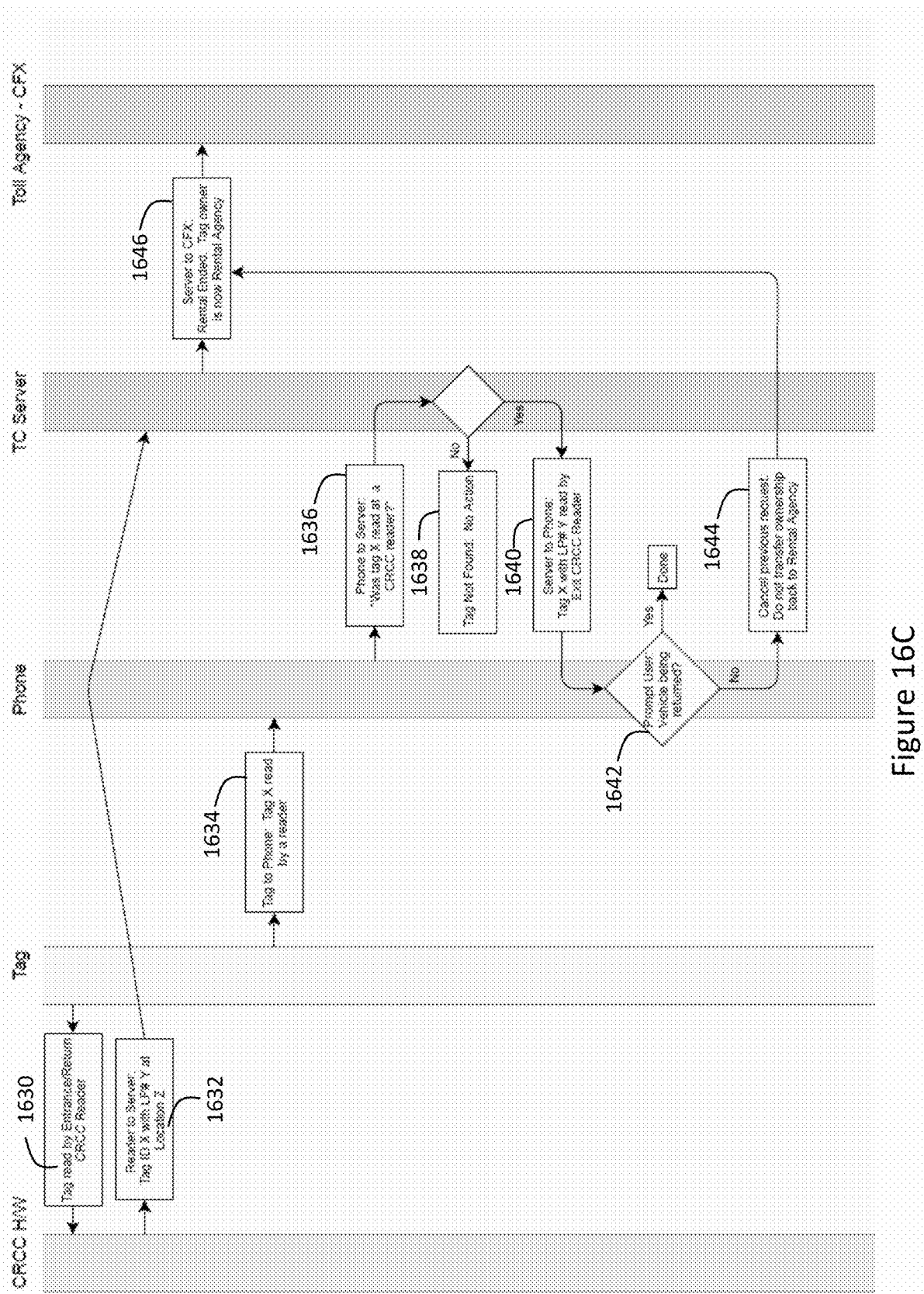
FIG. 16C is a further exemplary transaction flow diagram for a rental car having a BLE tag.

When a rental vehicle arrives back at a rental car center to be returned, as shown in FIG. 16C a reader 1510 at the entrance of the site will read the tag 1512, and a camera 1511 will read the license plate of the vehicle. The onsite hardware will then immediately connect to the database server 1518 and close the rental session.

The exemplary process of FIG. 16C for return of a rental vehicle is as follows: at step 1630 the BLEET is read by a reader at the CRCC on entry to the rental center. The vehicle license plate may also be read at this time. At step 1632 the CRCC reader 1510 notifies the TC server 1516 that a tag matched to a particular user has been read at that location as a return vehicle. The license plate number may also be sent in this transaction if read at that location or if previously associated with the user and/or the tag. The TC server 1518 then notifies the tolling agency back office at step 1646 that the rental is ended and to reassign the tag back to the rental agency. At step 1634, the BLEET sends a message to the user's mobile phone app that the tag was read by the CRCC reader. At step 1636, the phone sends a message to the TC server via the cellular network inquiring whether the tag was read by the CRCC reader. If no, then step 1638 represents that no action is taken. If yes, then the server notifies the phone at step 1640 that the tag associated with the phone and a particular license plate and rental vehicle was read at the CRCC reader. This gives the user confirmation that the vehicle has been recognized as returned and that the tag will now be delinked from the user. At decision point 1642 the phone app prompts the user to confirm if the vehicle is being returned. If yes, then the process is complete. If no, then at step 1644, the TC server notifies the tolling agency back office to cancel the assignment of the tag back to the rental agency.

In another approach, as the vehicle approaches the exit of a rental car center, the reader 1510 at the exit also writes TDL (Time, Date, Location) information into the memory of the BLEET 1512. The phone 1514 then can access the TDL information and can immediately link the license plate number, Tag ID and user account in the tolling system back office 1518 without having to determine if the tag was read at an exit reader, since the TDL data confirms that it was read at a rental car center reader.

Figure 16D:
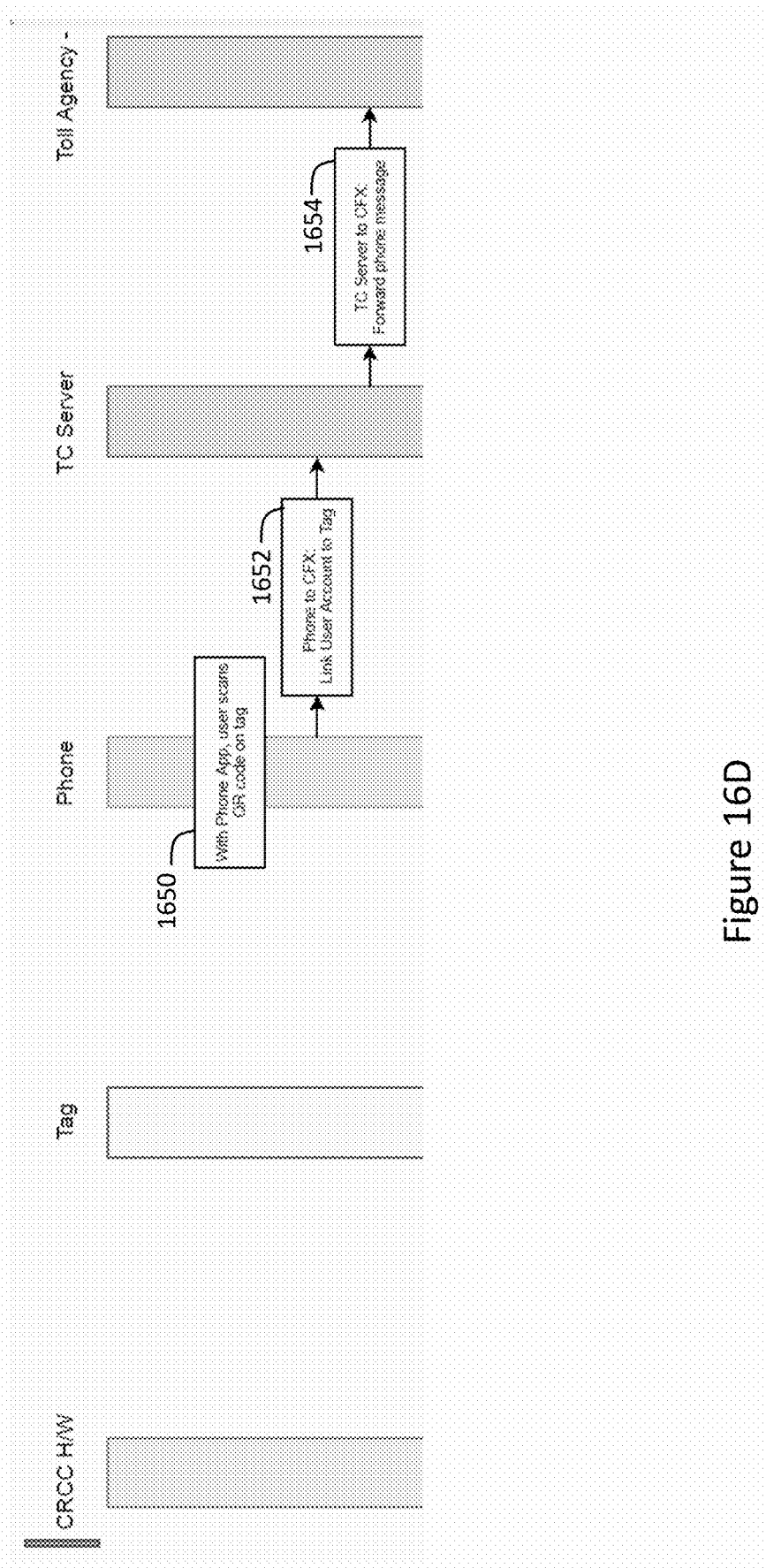
FIG. 16D is a further exemplary transaction flow diagram for a rental car having a BLE tag.

In another approach, shown in FIG. 16D, where an exit or entrance reader is not available in a rental car center, the BLEET 1512 will contain a label or printing containing a unique serial number (represented as human readable number, or optical encoding such as bar code, QR code, etc.) for the BLEET. The user will then be able to manually input the number into their phone 1514 app, or scan it using the camera on their smart phone 1514 as shown in FIG. 16D step 1650. The BLEET's memory will also be preprogrammed with the vehicle's license plate number which will be transmitted to the phone app via BLE interface. In case the vehicle license plate is not preprogrammed into the tag, the user's phone 1514 can scan the license plate or the user can manually input the number. The phone application will now have the user's account information, tag ID number and vehicle license plate number. These three data points will be combined and a rental session can be initiated with the toll agency back office 1518 via the phone's cellular data connection via steps 1652 (phone to TC server) and 1654 (TC server to tolling agency).

Figure 16E:
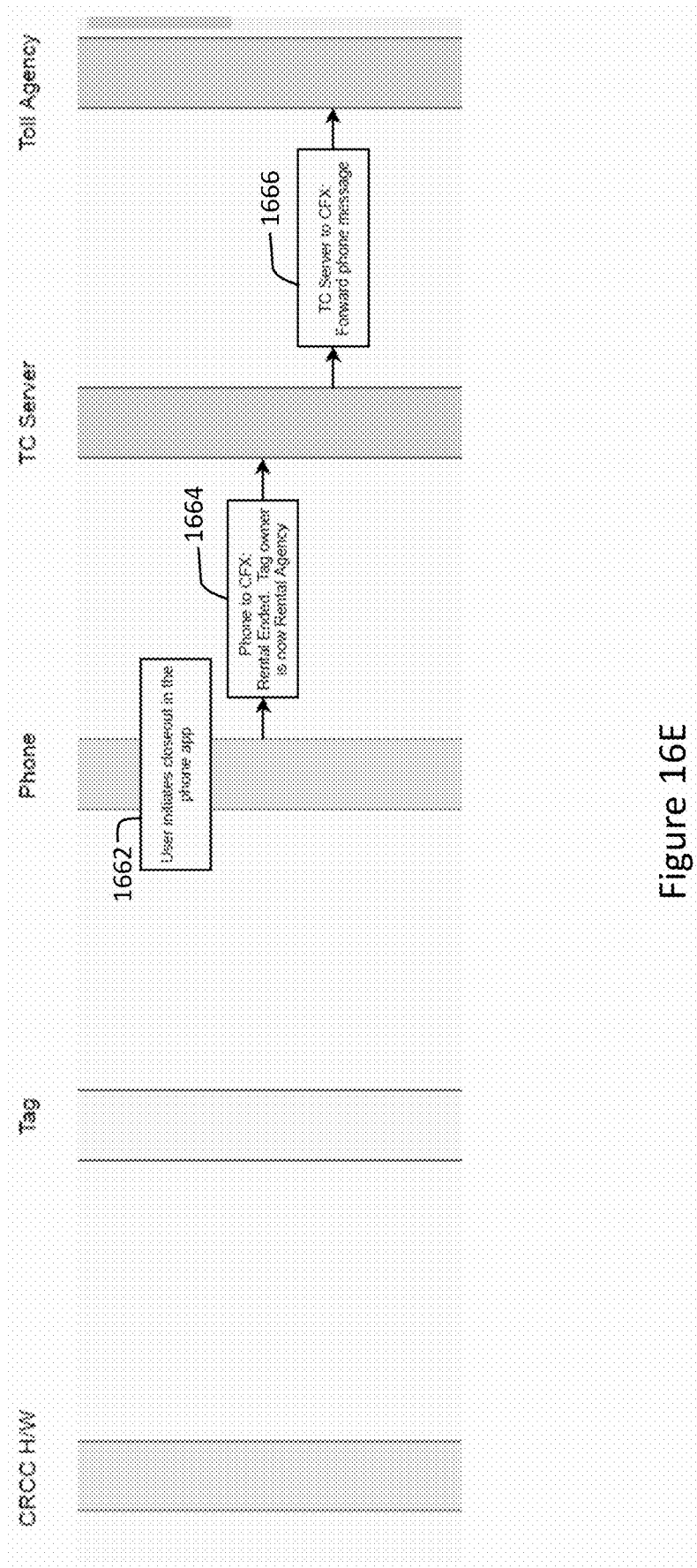
FIG. 16E is a further exemplary transaction flow diagram for a rental car having a BLE tag.

In the approach, shown in FIG. 16E, where there are no readers available at the rental car facility, the user's phone 1514 application can be used to initiate closure of a rental car tolling session when the vehicle is being returned as shown in step 1662. When the user clicks the session close button in their application, the phone application will transmit the information to the tolling back office 1518 to close the session as shown in step 1664. At step 1666, the TC server notifies the tolling agency back office of the close out of the rental assignment.

Figure 16F:
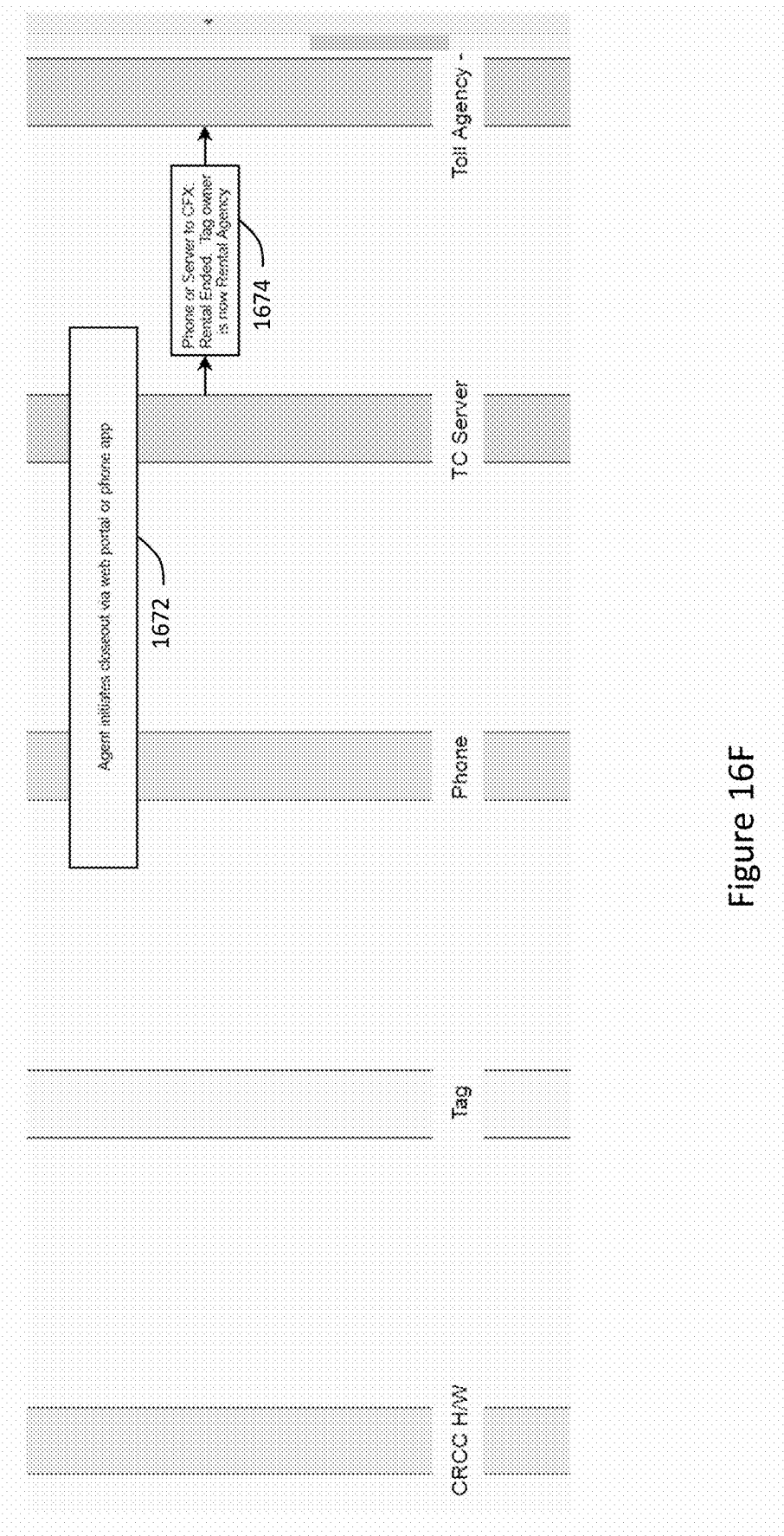
FIG. 16F is a further exemplary transaction flow diagram for a rental car having a BLE tag.

As shown in FIG. 16F, the rental agent may close out the rental car tolling session via a phone 1520 app or a web portal at step 1672. At step 1674, the TC server notifies the tolling agency of the closure of the assignment of the tag to the user.

Although not described above, various components discussed above, such as a BLEET, smart phone, tag reader, TOSE, etc., may be implemented in hardware, firmware, software or a combination of hardware, firmware and software. For example, a device such as a user's smart phone may include a processor, microprocessor, ASIC, FPGA or other logic device, along with memory, an input device, output device, communication interface and a bus that permits communication among the elements of the device. While Bluetooth® LE is described above as an exemplary communications standard between the smart phone client application and the transponder, the invention is not limited to the use of Bluetooth® LE. For example, passive Bluetooth may be used instead of Bluetooth® LE.

The processor of the smart phone (or the processor of one or more of the other devices described above) may include one or more processors, microprocessors, or processing logic that may interpret and execute instructions. The memory may include a random access memory (RAM) or another type of dynamic storage device that may store information and instructions for execution by the processor. The memory may also include a read only memory (ROM) device or another type of static storage device that may store static information and instructions for use by the processor. The memory may further include a solid state drive (SDD), a magnetic and/or optical recording medium (e.g., a hard disk) and its corresponding drive.

The input device may include a mechanism that permits a user to input information to the device, such as a keyboard, a keypad, a mouse, a pen, a microphone, a touch screen, voice recognition and/or biometric mechanisms, etc. The output device may include a mechanism that outputs information to the user, including a display, a printer, a speaker, etc. In some implementations, a touch screen display may act as both an input and an output device. In still other implementations, the device may be a "headless" device that does not include an input device and/or output device.

The communication interface may include a transceiver for communicating with other devices via wired, wireless or optical mechanisms. The communication interface may also include one or more radio frequency (RF) transmitters, receivers and/or transceivers and one or more antennas for transmitting and receiving RF data. The communication interface may also include a modem or an Ethernet® interface to a local area network (LAN) or other mechanisms for communicating with other elements.

In an exemplary implementation, one or more components described above may perform operations in response to its respective processor (or processors) executing sequences of instructions contained in a non-transitory computer-readable medium. A computer-readable medium may be defined as a physical or logical memory device. The software instructions may be read into memory from another computer-readable medium (e.g., a hard disk drive (HDD), SSD, etc.), or from another device via a communication interface. Alternatively, hard-wired circuitry may be used in place of or in combination with software instructions to implement processes consistent with the implementations described herein. Thus, implementations described herein are not limited to any specific combination of hardware circuitry, firmware and software.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A system, comprising:
   a Radio Frequency Identification (RFID) reader located at an entry point, said entry point associated with a geographical area;
   an RFID transponder comprising a non-transitory computer-readable medium configured to transmit an advertisement message in response to said RFID transponder being read by said RFID reader, wherein said RFID transponder includes:
      a first radio frequency transceiver comprising a non-transitory computer-readable medium containing computer program code configured to transmit user identification and user-related data to said RFID reader, and
      a Bluetooth® transceiver; and
   a smart phone comprising a global positioning system receiver and a non-transitory computer-readable medium containing a software application configured to:
      receive said advertisement message from said RFID transponder,
      determine, via said global positioning system receiver, a location in response to receiving said advertisement message from said RFID transponder,
      receive a discount authorization code from a user,
      determine a toll fee based on a day of a week, a time of day, said location, and said discount authorization code,
      initiate a first credit card debit for said toll fee with a first credit card over a cellular network connection,
      if said first credit card debit was successful, communicate with said RFID transponder that said toll fee was successfully deducted,
      if said first credit card debit was not successful, initiate a second credit card debit for said toll fee with a second credit card over said cellular network connection, and
      if said second credit card debit was successful, communicate with said RFID transponder that said toll fee was successfully deducted from said second credit card,
   wherein said RFID transponder is enabled for a further transaction in response to said toll fee being successfully deducted, and
   wherein said discount authorization code is a limited use discount authorization code having a predetermined use limit, and wherein said software application is configured to notify said user when said predetermined use limit is exceeded.

2. The system of claim 1, wherein said software application is further configured to:
   deduct said toll fee from a deposit amount prior to initiating said first credit card and said second credit card debit,
   communicate with said RFID transponder that said toll fee was successfully deducted, and
   enable said RFID transponder for a further transaction in response to said toll fee being successfully deducted from said deposit amount.

3. The system of claim 1, wherein said software application is further configured to:
   communicate with said RFID transponder that said toll fee was not successfully deducted from said first and second credit cards if said first credit card debit and said second credit card debit were not successful, and disable said RFID transponder for a further transaction in response to said toll fee not being successfully deducted.

4. The system of claim 1, wherein said discount authorization code is a limited time discount authorization code having a predetermined time limit, and wherein said software application is configured to notify said user when said predetermined time limit is exceeded.

5. The system of claim 1, wherein said software application is further configured to:
receive a vehicle occupancy level from said user, and
wherein said toll fee is additionally based on said vehicle occupancy level.

6. The system of claim 1, wherein said software application is further configured to:
automatically determine a vehicle occupancy level, and
wherein said toll fee is additionally based on said automatically determined vehicle occupancy level.

7. The system of claim 1, wherein said RFID transponder is further configured to:
receive location information from said RFID reader, and
transmit said location information to said software application,
wherein said toll fee is additionally based on said location information transmitted by said RFID transponder.

8. The system of claim 7, wherein said RFID transponder is further configured to:
store a plurality of locations, and
transmit said plurality of locations to said software application in one message.

9. A method for congestion pricing using transponders, the method comprising:
providing a Radio Frequency Identification (RFID) reader located at an entry point, said entry point associated with a geographical area;
transmitting an advertisement message from an RFID transponder in response to said RFID transponder being read by said RFID reader, wherein said RFID transponder includes:
a first radio frequency transceiver comprising a non-transitory computer-readable medium containing computer program code configured to transmit user identification and user-related data to said RFID reader, and
a Bluetooth® transceiver;
receiving said advertisement message by a software application of a smart phone comprising a global positioning system receiver;
determining, via said software application and said global positioning system receiver, a location in response to receiving said advertisement message from said RFID transponder;
receiving a discount authorization code from a user at said software application;
determining a toll fee based on a day of a week, a time of day, said location, and said discount authorization code;
initiating a first credit card debit using said software application for said toll fee with a first credit card over a cellular network connection, and communicating with said RFID transponder whether said toll fee was successfully deducted;
initiating a second credit card debit using said software application for said toll fee with a second credit card over said cellular network connection if said first credit card debit was not successful, and communicating with said RFID transponder whether said toll fee was successfully deducted from said second credit card;
enabling said RFID transponder for a further transaction in response to said toll fee being successfully deducted; and
notifying said user using said software application when a use limit of said discount authorization code is exceeded.

10. The method of claim 9, further comprising:
deducting said toll fee from a deposit amount using said software application prior to initiating said first credit card and said second credit card debit;
communicating with said RFID transponder that said toll fee was successfully deducted; and
enabling said RFID transponder for a further transaction in response to said toll fee being successfully deducted from said deposit amount.

11. The method of claim 9, further comprising:
communicating with said RFID transponder that said toll fee was not successfully deducted from said first and second credit cards if said first credit card debit and said second credit card debit were not successful, and
disabling said RFID transponder for a further transaction in response to said toll fee not being successfully deducted.

12. The method of claim 9, further comprising:
notifying said user using said software application when a time limit for using said discount authorization code is exceeded.

13. The method of claim 9, further comprising:
receiving a vehicle occupancy level from said user; and
additionally basing said toll fee on said vehicle occupancy level.

14. The method of claim 9, further comprising:
automatically determining a vehicle occupancy level; and
additionally basing said toll fee on said vehicle occupancy level.

15. The method of claim 9, further comprising:
receiving location information from said RFID reader by said RFID transponder;
transmitting said location information from said RFID transponder to said software application; and
additionally basing said toll fee on said location information transmitted by said RFID transponder.

16. The method of claim 15, further comprising:
storing a plurality of locations on said RFID transponder; and
transmitting said plurality of locations from said RFID transponder to said software application in one message.

17. The system of claim 1, wherein said predetermined use limit comprises a specific number of congestion pricing zone entries.

18. The system of claim 17, wherein the software application is configured to notify said user when the specific number of congestion pricing zone entries is exceeded.

19. The system of claim 1, wherein said toll fee is additionally based on a vehicle occupancy level, wherein said vehicle occupancy level is based on a number of occupants having smart phones in a vehicle of said user.

20. The system of claim 1, wherein said toll fee is additionally based on a vehicle occupancy level, wherein said vehicle occupancy level is based on smart phones of occupants of a vehicle communicating with said smart phone of said user.

* * * * *